US009251506B2

(12) United States Patent
Benjamin et al.

(10) Patent No.: US 9,251,506 B2
(45) Date of Patent: Feb. 2, 2016

(54) USER INTERFACES FOR CONTENT CATEGORIZATION AND RETRIEVAL

(75) Inventors: Todd Benjamin, Saratoga, CA (US); Brett Bilbrey, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 940 days.

(21) Appl. No.: 12/652,702

(22) Filed: Jan. 5, 2010

(65) Prior Publication Data

US 2011/0167078 A1 Jul. 7, 2011

(51) Int. Cl.
| | |
|---|---|
| G06F 3/00 | (2006.01) |
| G06F 3/048 | (2013.01) |
| G06F 15/16 | (2006.01) |
| H04M 3/56 | (2006.01) |
| H04L 12/18 | (2006.01) |
| G06Q 10/10 | (2012.01) |

(52) U.S. Cl.
CPC ............ *G06Q 10/107* (2013.01); *G06Q 10/109* (2013.01)

(58) Field of Classification Search
CPC ....... G06F 9/4443; G06F 3/0481; G06F 8/38; G06F 1/163; G06F 3/011; G06F 3/048; G06F 3/00
USPC .................... 715/751, 753; 709/204
See application file for complete search history.

(56) References Cited

U.S. PATENT DOCUMENTS

| | | | | |
|---|---|---|---|---|
| 5,072,412 A * | 12/1991 | Henderson et al. | ............ | 715/804 |
| 5,874,958 A * | 2/1999 | Ludolph | ......................... | 715/781 |
| 6,327,623 B2 * | 12/2001 | Watts | ............................. | 709/229 |
| 6,807,666 B1 * | 10/2004 | Evans et al. | .................... | 718/108 |
| 7,299,281 B1 * | 11/2007 | Wang et al. | .................... | 709/224 |
| 7,370,273 B2 | 5/2008 | Beyer et al. | | |
| 7,546,546 B2 * | 6/2009 | Lewis-Bowen et al. | ...... | 715/774 |
| 2002/0175955 A1 | 11/2002 | Gourdol et al. | | |
| 2003/0179240 A1 * | 9/2003 | Gest | .............................. | 345/779 |
| 2004/0139058 A1 | 7/2004 | Gosby et al. | | |
| 2008/0193010 A1 | 8/2008 | Eaton et al. | | |
| 2009/0171866 A1 * | 7/2009 | Harun et al. | .................... | 706/12 |
| 2009/0216715 A1 * | 8/2009 | Dexter | .............................. | 707/3 |
| 2009/0240647 A1 | 9/2009 | Green et al. | | |
| 2009/0248464 A1 * | 10/2009 | Trinh et al. | ........................ | 705/7 |
| 2009/0300520 A1 * | 12/2009 | Ashutosh | ............ | H04L 12/1831 715/756 |

OTHER PUBLICATIONS

Fitzpatrick et al., Automatic Desktop Manipulation Based on Calendar Events, Aug. 1993, IBM Technical Disclosure Bulletin, vol. 36, No. 8, p. 327.*

(Continued)

*Primary Examiner* — Jennifer To
*Assistant Examiner* — Hugo Molina
(74) *Attorney, Agent, or Firm* — Blank Rome LLP

(57) ABSTRACT

Methods, systems, and computer-readable media provide a scenario desktop for recording a current event scenario and a content desktop for presenting information about a previously recorded event scenario. When a first event scenario is detected on the mobile device, the scenario desktop is presented on the mobile device. The scenario desktop exists in parallel with a default primary desktop of the mobile device. An information bundle is created for the first event scenario, including one or more documents accessed through the scenario desktop during the first event scenario. Access to the one or more documents is automatically provided on the mobile device during a second event scenario related to the first event scenario. The access is provided through the content desktop existing in parallel with the primary desktop and the scenario desktop.

16 Claims, 12 Drawing Sheets

(56) References Cited

OTHER PUBLICATIONS

WebEx Meeting Center User's Guide, Dec. 31, 2007, pp. 103 and 110.*

Cowart, Robert, Mastering Windows 95, 1995, SYBEX Inc., pp. 36-37.*

Benjamin et al., U.S. Appl. No. 12/652,686, filed Jan. 5, 2010, 64 pages.

* cited by examiner

800

810 Presenting a primary desktop on a display of a mobile device

820 At a first moment in time and while the primary desktop is presented on the mobile device, detecting on the mobile device a first event scenario, the first event scenario being defined by one or more participants and one or more contextual cues concurrently monitored by the mobile device and observable to a user of the mobile device

830 In response to detecting the first event scenario and without requiring further user input, presenting an alternate, scenario desktop on the display of the mobile device in place of the primary desktop

840 Receiving user input accessing one or more documents through the scenario desktop during the first event scenario

850 Creating an information bundle associated with the first event scenario, the information bundle comprising respective data identifying the one or more participants, the one or more contextual cues, and the one or more documents that are accessed by the user through the scenario desktop

FIG. 8

USER INTERFACES FOR CONTENT CATEGORIZATION AND RETRIEVAL

TECHNICAL FIELD

This subject matter is generally related to user interfaces for content categorization and retrieval on a mobile device.

BACKGROUND

Modern mobile devices such as "smart" phones have become an integral part of people's daily lives. Many of these mobile devices can support a variety of applications. These applications can relate to communications such as telephony, email and text messaging, or organizational management, such as address books and calendars. Some mobile devices can even support business and personal applications such as creating presentations or spreadsheets, word processing and providing access to websites and social networks. All of these functions applications can produce large volumes of information that needs to be organized and managed for subsequent retrieval.

Conventional methods for organizing and managing information include allowing the user to store information or content into directories and folders of a file system and use descriptive metadata, keywords, or filenames to name the directories and folders. Information can be subsequently retrieved and presented to the user in response to the user manually navigating through the directories and folders of the file system or to user-entered search queries. This manual information categorization and retrieval can be laborious and time-consuming.

SUMMARY

Methods, systems, and computer-readable media for providing a scenario desktop for recording a current event scenario occurring in association with (e.g., in proximity to) a mobile device, and a content desktop for presenting information about a previously recorded event scenario are disclosed. An event scenario is defined by one or more participants and one or more contextual cues concurrently monitored by the mobile device and observable by a human user of the mobile device. When a first event scenario is detected on the mobile device, the scenario desktop is presented on the mobile device. The scenario desktop can exist in parallel with a default primary desktop of the mobile device. An information bundle is created (e.g., in real-time) for the first event scenario. The information bundle identifies, for example, one or more documents accessed through the scenario desktop during the first event scenario and retrievable based on the one or more contextual cues. Access to the one or more documents can be automatically provided on the mobile device during a second event scenario that is related to the first event scenario through the one or more common contextual cues. The access to the documents can be provided through a content desktop that exists in parallel with the primary desktop and the scenario desktop. Other scenario-based content retrieval and presentation methods are also disclosed.

In various implementations, the methods and systems disclosed in this specification may offer none, one or more of the following advantages.

In one example, an alternate desktop environment (e.g., the scenario desktop) can be presented in parallel with a default desktop environment (e.g., the primary desktop) during recording of an event scenario. The alternate desktop environment can provide all the functions available through a default system desktop (e.g., the primary desktop), and various controls for monitoring and annotating the contextual cues present in the event scenario. The parallel existence of the scenario desktop and the primary desktop can allow the user to confine operations (e.g., document accesses) relevant to the current event scenario in a dedicated desktop environment, and exclude operations carried out in the primary desktop from the recording of the current event scenario.

In addition, the dedicated scenario desktop can be free of the clutter and irrelevant items scattered on the default system desktop, thereby reducing distraction to the user during the current event scenario. Furthermore, the user can monitor and provide annotations in real time to describe the current event scenario. No subsequent categorization is needed, so backlog of organization tasks can be reduced.

In one example, documents associated with a past event scenario can be automatically retrieved and presented to the user during an occurrence of a related event scenario. The documents can be presented in an alternate desktop environment (e.g., a content desktop), in parallel with the primary desktop and the scenario desktop. The content desktop can restrict access to only those documents that are associated with a specific previously recorded event scenario. Because the primary desktop, the scenario desktop, and the content desktop(s) exist in parallel, the user is less likely to get confused as to what document he or she is currently reviewing.

The details of one or more embodiments of the subject matter described in the specification are set forth in the accompanying drawings and the description below. Other features, aspects, and advantages of the subject matter will become apparent from the description, the drawings, and the claims.

DESCRIPTION OF DRAWINGS

FIG. 8 is a flow diagram of an example process for presenting a scenario desktop for recording a current event scenario.

DETAILED DESCRIPTION

Example Mobile Device

Figure 1:
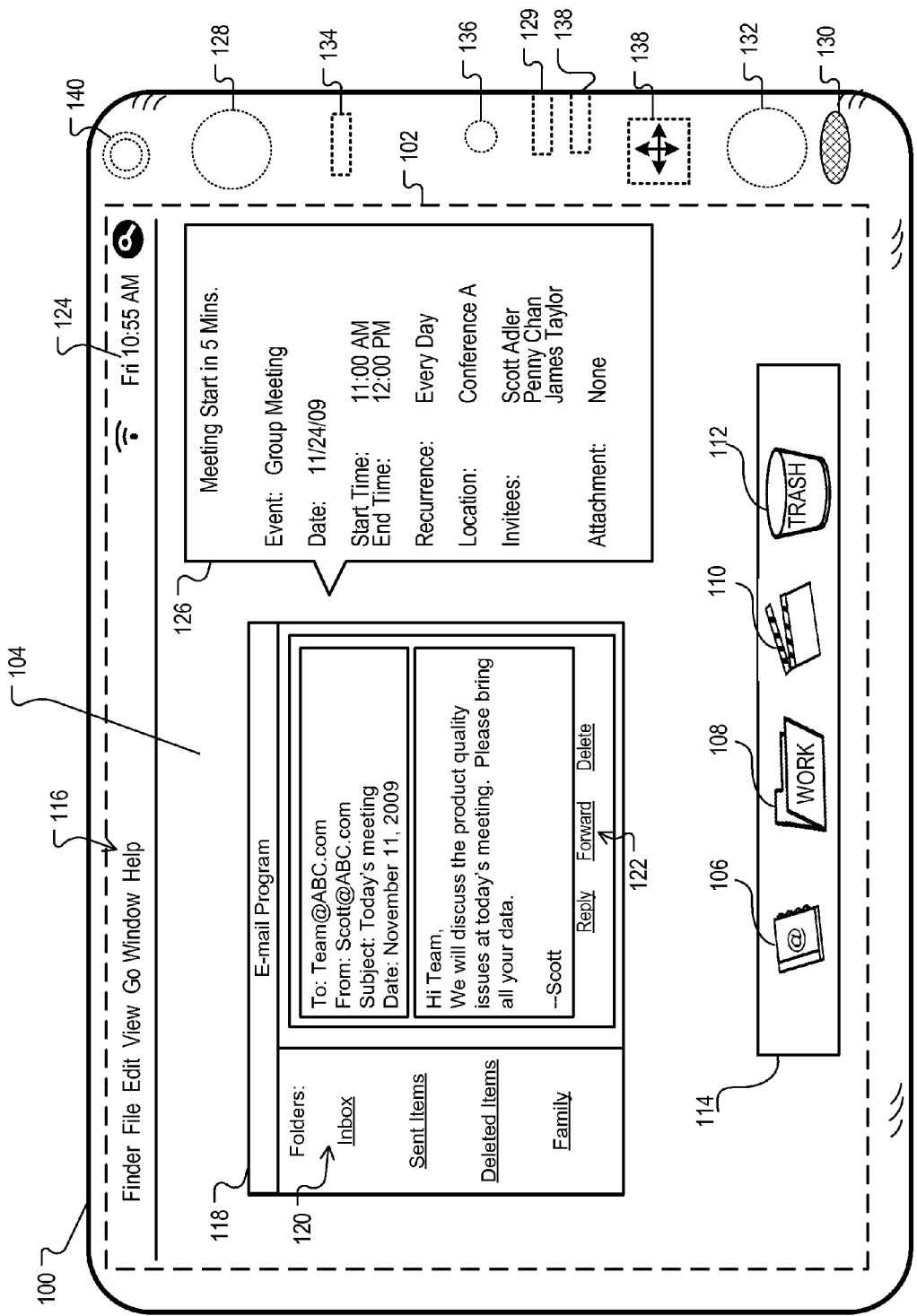
FIG. 1 is a block diagram of an example mobile device.

FIG. 1 is a block diagram of example mobile device 100. The mobile device 100 can be, for example, a tablet device, a handheld computer, a personal digital assistant (PDA), a cellular telephone, a network appliance, a digital camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can be implemented with liquid crystal display (LCD) technology, light emitting polymer display (LPD) technology, or some other display technology. The touch-sensitive display 102 can be sensitive to haptic and/or tactile contact with a user. In addition, the device 100 can include a touch-sensitive surface (e.g., a trackpad, or a touchpad).

In some implementations, the touch-sensitive display 102 can be multi-touch-sensitive display. The multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device.

A user can interact with the device 100 using various inputs. Example inputs include touch inputs and gesture inputs. A touch input is an input where a user holds his or her finger (or other input tool) at a particular location. A gesture input is an input where a user moves his or her finger (or other input tool). An example gesture input is a swipe input, where a user swipes his or her finger (or other input tool) across the screen of the touch-sensitive display 102. In some implementations, the device can detect inputs that are received in direct contact with the display 102, or that are received within a particular vertical distance of the display 102 (e.g., within one or two inches of the display 102). Users can simultaneously provide input at multiple locations on the display 102. For example, inputs simultaneously touching at two or more locations can be received.

In some implementations, the mobile device 100 can display one or more graphical user interfaces (e.g., default system desktop 104) on the touch-sensitive display 102 for providing the user access to various system objects and for conveying information to the user. In some implementations, the default system desktop 104 can include one or more display objects that represent system objects including various device functions, applications, windows, files, alerts, events, or other identifiable system objects. In this particular example, the system desktop 104 includes display object 106 for an address book application, display object 108 for a file folder named "work", display object 110 for a camera function on the device 100, and display object 112 for a destination for deleted files (e.g., a "trash can"). Other display objects are possible.

In some implementations, the display objects can be configured by a user, e.g., a user may specify which display objects are displayed, and/or may download additional applications or other software that provides other functionalities and corresponding display objects. In some implementations, the display objects can be dynamically generated and presented based on the current context and inferred needs of the user. In some implementations, the currently presented display objects can be grouped in a container object, such as task bar 114.

Example Mobile Device Functionality

In some implementations, the mobile device 100 can implement multiple device functionalities, such as a telephony device; an e-mail device; a map device; a WiFi base station device; and a network video transmission and display device. As part of one or more of these functionalities, the device 100 can present graphical user interfaces on the touch-sensitive display 102 of the mobile device, and also responds to input received from a user, for example, through the touch-sensitive display 102. For example, a user can invoke various functionalities by launching one or more programs on the device (e.g., by touching one of the display objects in the task bar 114 of the device). A user can alternatively invoke particular functionality in other ways including, for example, using one of the use-selectable menus 116 included in the system desktop 104. In some implementations, particular functionalities are automatically invoked according to the current context or inferred needs of the user as determined automatically and dynamically by the mobile device 100, for example, as described in herein.

Once a program has been selected, one or more windows or pages corresponding to the program can be displayed on the system desktop 104 of the device 100. A user can navigate through the windows or pages by touching appropriate locations on the system desktop 104 through the touch-sensitive display 102. For example, the window 118 corresponds to an email application. The user can interact with the window 118 using touch input much as the user would interact with the window using mouse or keyboard input. For example, the user can navigate through various folders in the email program by touching one of the user selectable controls 120 corresponding to the folders listed in the window 118 As another example, a user can specify that he or she wishes to reply, forward, or delete the current e-mail by touching one of the user-selectable controls 122 present on the display.

In some implementations, notifications can be generated by the operating system or applications residing on the mobile device 100. For example, the device 100 can include internal clock 124, and notification window 126 of a scheduled calendar event can be generated by a calendar application and presented on the system desktop 104 at a predetermined time (e.g., 5 minutes) before the scheduled time of the calendar event.

In some implementations, upon invocation of a device functionality, the system desktop 104 of the mobile device 100 changes, or is augmented with other user interface elements, to facilitate user access to particular functions associated with the corresponding device functionality. In some implementations, the system desktop 104 is replaced with an alternate desktop (e.g., a scenario-specific desktop) based on the current context and the inferred needs of the user at the moment, as described herein.

In some implementations, the mobile device 100 can implement network distribution functionality. For example, the functionality can enable the user to take the mobile device 100 and provide access to its associated network while traveling. In particular, the mobile device 100 can extend Internet access (e.g., WiFi) to other wireless devices in the vicinity. For example, the mobile device 100 can be configured as a base station for one or more devices. As such, the mobile device 100 can grant or deny network access to other wireless devices.

In some implementations, the mobile device 100 may include circuitry and sensors for supporting a location determining capability, such as that provided by the global positioning system (GPS) or other positioning systems (e.g., systems using WiFi access points, television signals, cellular grids, Uniform Resource Locators (URLs)). In some implementations, a positioning system (e.g., GPS receiver 128) can be integrated into the mobile device 100 or provided as a separate device that is coupled to the mobile device 100 through an interface (e.g., port device 129) to provide access to location-based services. In some implementations, the positioning system can provide more accurate positioning within a building structure, for example, using sonar technologies.

In some implementations, the mobile device 100 can include one or more input/output (I/O) devices and/or sensor devices. For example, speaker 130 and microphone(s) 132 can be included to facilitate voice-enabled functionalities, such as phone and voice mail functions.

In some implementations, proximity sensor 134 can be included to facilitate the detection of the proximity (or distance) of the mobile device 100 to a user of the mobile device 100. Other sensors can also be used. For example, in some implementations, ambient light sensor 136 can be utilized to facilitate adjusting the brightness of the touch-sensitive display 102. In some implementations, accelerometer 138 can be utilized to detect movement of the mobile device 100, as indicated by the directional arrows.

In some implementations, the port device 129, e.g., a Universal Serial Bus (USB) port, or a docking port, or some other wired port connection, can be included. The port device 129 can, for example, be utilized to establish a wired connection to other computing devices, such as other communication devices, network access devices, a personal computer, a printer, a display screen, or other processing devices capable of receiving and/or transmitting data. In some implementations, the port device 129 allows the mobile device 100 to synchronize with a host device using one or more protocols, such as, for example, the TCP/IP, HTTP, UDP and any other known protocol.

The mobile device 100 can also include one or more wireless communication subsystems, such as 802.11b/g communication device 138, and/or Bluetooth™ communication device 188. Other communication protocols can also be supported, including other 802.x communication protocols (e.g., WiMax, WiFi, 3G), code division multiple access (CDMA), global system for mobile communications (GSM), Enhanced Data GSM Environment (EDGE), etc.

In some implementations, the mobile device 100 can also include camera lens and sensor 140. The camera lens and sensor 140 can capture still images and/or video. In some implementations, the camera lens can be a bi-directional lens capable of capturing objects facing either or both sides of the mobile device. In some implementations, the camera lens is an omni-directional lens capable of capturing objects in all directions of the mobile device.

Detection of an Event Scenario

As described with respect to the example mobile device shown in FIG. 1, a multifunction mobile device can detect events and changes occurring within the software environment of the mobile device through various state monitoring instructions. In addition, the multi-functional mobile device can also utilize various built-in sensory capabilities to detect the current status or changes occurring to the mobile device's own physical state and/or to the physical environment immediately surrounding the mobile device. These sensory capabilities make it possible for the mobile device to detect and record an event scenario in a way that mimics how a human user of the mobile device would perceive, interpret, and remember the event scenario.

Because each aspect of an event scenario experienced by the human user can potentially be used by the brain as a memory cue to later retrieve other pieces of information conveyed to the user during the event scenario, by recognizing and recording these event scenarios on the mobile device, the mobile device can facilitate the organization and retrieval of relevant and useful information for the user. User interfaces that facilitate the recording and subsequent retrieval and presentation of the event scenarios are disclosed herein.

In some implementations, the monitoring of the software environment and physical status of the mobile device, and the physical environment immediate around the mobile device can be ongoing, provided that enough computing resources are available to the mobile device. Alternatively, some of the monitoring can start only after a record-worthy event scenario has been detected.

The detection of a meaningful event scenario that warrants further processing and/or a permanent record can be based on a number of indicators. For example, a notification of the imminent start of a scheduled calendar event can be an indicator that a record-worthy event scenario is about to occur. For another example, presence of one or more of specially-designated people (e.g., best friends, supervisors, doctor, accountant, lawyer, etc.) can be used as an indicator for a record-worthy event scenario. For yet another example, detected presence of the mobile device in a specially-designated location (e.g., doctor's office, the bank, Omni Parker House, conference room A, etc.) can also be used as an indicator for a record-worthy event scenario. In some implementations, the end of an event scenario can be detected according to the absence or expiration of all or some of the indicator(s) that marked the start of the event scenario. In addition to automatically triggered indicators (such as those shown in the above examples), manual triggers can also be used to mark the start of an event scenario. For example, a software or hardware user interface element can be provided to receive user input indicating the start of an event scenario.

Figure 2:
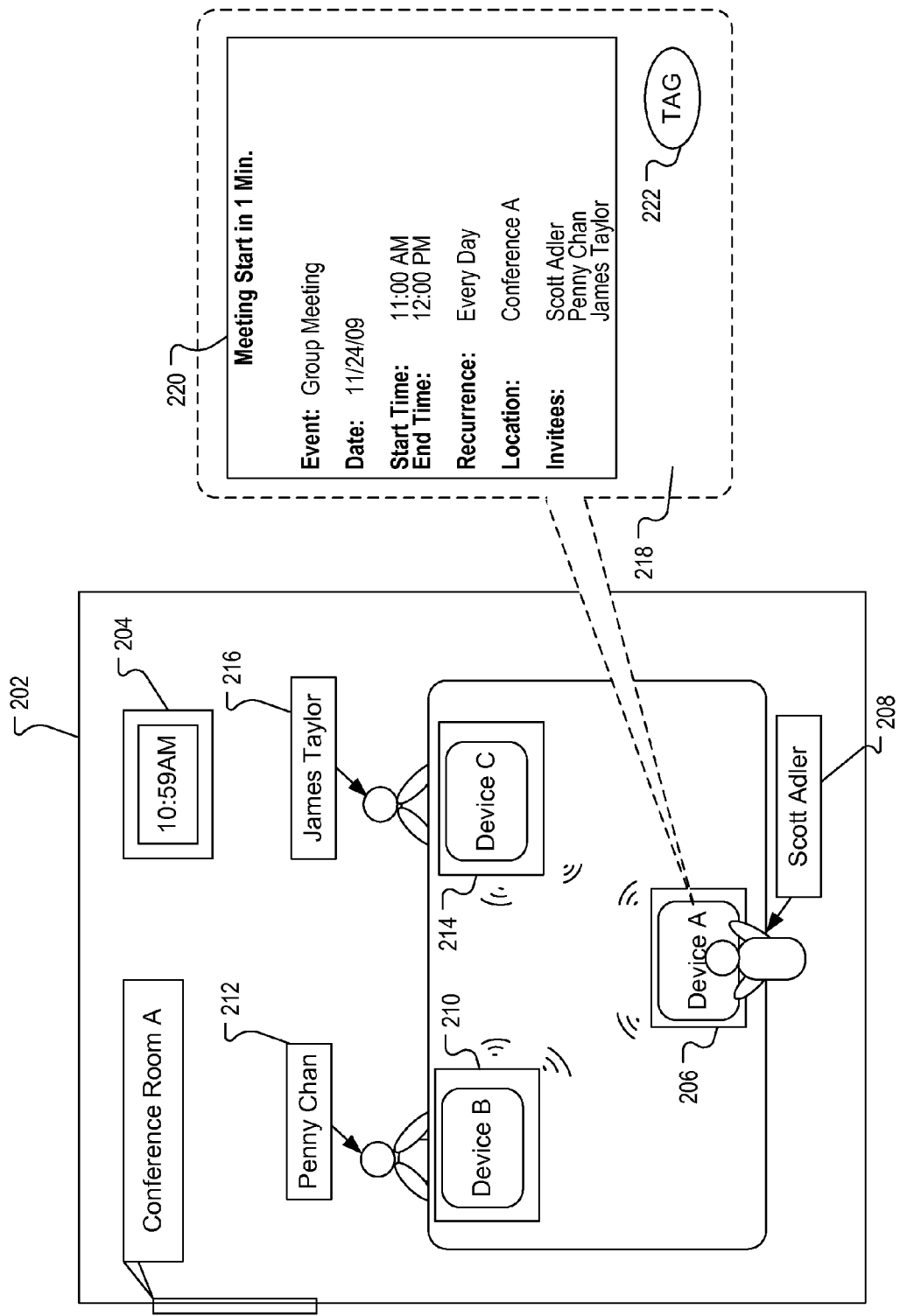
FIG. 2 illustrates the detection of an example event scenario.

FIG. 2 illustrates an example process for recognizing/detecting an event scenario associated with a mobile device.

An event scenario can include a number of elements, such as the people participating in the event scenario (i.e., the participants), the location at which the participants are gathered, the start and end times of the event scenario, the purpose or subject matter of the gathering, the virtual and/or physical incidents that ensued during the event scenario, the information and documents accessed during the event scenario, various characteristics of the environment or setting of the event scenario, and so on.

In the example scenario shown in FIG. 2, three people (e.g., Scott Adler 208, Penny Chan 212, and James Taylor 216) have gathered in a conference room (e.g., conference room A 202) for a scheduled group meeting. This meeting is one of a series of routine meetings. The scheduled time for the group meeting is 11:00 am every day, and the meeting is scheduled to last an hour. An electronic meeting invitation had previously been sent to and accepted by each group member. The team leader (e.g., Scott Adler 208) has sent an email to each team member stating the agenda for this meeting is to discuss product quality issues. During this meeting, one or more persons will generate some notes, share some sales data and other product issue related information, and have a discussion about the particular product quality issues raised by the participants. A proposed solution to collaborate with a quality assurance partner will be proposed and his contact information is provided to the other team members.

In this example, each user present at the meeting can carry a respective mobile device (e.g., devices 206, 210, and 214) that implements a scenario-based content categorization, retrieval and presentation method described herein. The mobile device (e.g., device 206) can be a mobile device described with respect to FIG. 1 that includes touch-sensitive display and a variety of sensors and processing capabilities for gathering information about the physical environment surrounding the mobile device.

In this example, as the scheduled meeting time approaches, notification window 220 can be generated and presented within a default system desktop 218 (partially shown) of the mobile device 206. The notification window 220 indicates that a meeting is about to start (e.g., in 1 minute). Other information such as the subject, the date, the start and end times, the recurrence frequency, the location, and the invitees, and so on, can also be included in the notification window 220. This event notification generated by the user's electronic calendar can be used as an indicator that a record-worthy event scenario is about to occur. When the mobile device detects such an indicator, it can register the start of the event scenario.

Alternatively, the user of the mobile device 106 (e.g., Scott Adler 108) can set up an automatic trigger that detects the simultaneous presence of all group members (e.g., Scott Adler 208, Penny Chan 212, and James Taylor 216), and use that as an indicator for the start of the event scenario. For example, when the device 206 senses the presence of the devices associated the other two meeting participants (e.g., devices 210 and 214) through some wireless communications, device 206 can register the start of the event scenario. In some implementations, the presence of devices can be sensed using Bluetooth technology or Radio Frequency Identification (RFID) technology.

Alternatively, the user of the mobile device 206 can set up an automatic trigger that detects the presence of the mobile device 206 in conference room A, and use that as an indicator for the start of the event scenario. For example, when the positioning system on the mobile device 206 determines that its current location is in conference room A, the mobile device 206 can register the start of the event scenario.

Alternatively, the user of the mobile device 206 can set up an automatic trigger that detects not only the simultaneous presence of all group members but also the time (e.g., 11:00 am), and location (e.g., Conference Room A), and use that combination of facts as an indicator for the start of the event scenario.

Alternatively, user interface element 222 (e.g., a "TAG" button) can be displayed on the default system desktop 218 of the mobile device 106. When the user (e.g., Scott Adler 124) touches the user interface element 222 on the system desktop 218, the mobile device can register this user input as an indicator for the start of the event scenario.

Other methods of detecting or recognizing indicators of recordable event scenarios are possible. For example, in addition to having users specify the indicators, the mobile device 106 can process the previously entered indicators and/or recorded scenarios to derive new indicators for event scenarios that may be of interest to the user.

Recording the Event Scenario within a Scenario-Specific Environment

After the mobile device detects the start of an event scenario, the mobile device can employ its various perception capabilities to monitor and record its own virtual and physical statuses as well as the statuses of its surrounding physical environment during the event scenario until an end of the event scenario is detected.

In some implementations, it is possible to monitor and record the event scenario in the background without user intervention, and all user interactions within the default system operating environment (e.g., through the default system desktop 218) can be recorded and associated with the current event scenario. However, in some implementations, a dedicated scenario-specific operating environment (e.g., a scenario desktop) can be provided (e.g., in parallel to the default system operating environment (e.g. the default system desktop)), such that only user interactions that occurred within the scenario-specific operating environment are associated with the current event scenario.

In addition, the scenario-specific operating environment can provide controls for monitoring and recording various aspects (e.g., the participants and contextual cues) of the current event scenario, and/or can allow the user to provide real-time annotations (e.g., functional and descriptive labels) for each aspect of the current event scenario.

Figure 3:
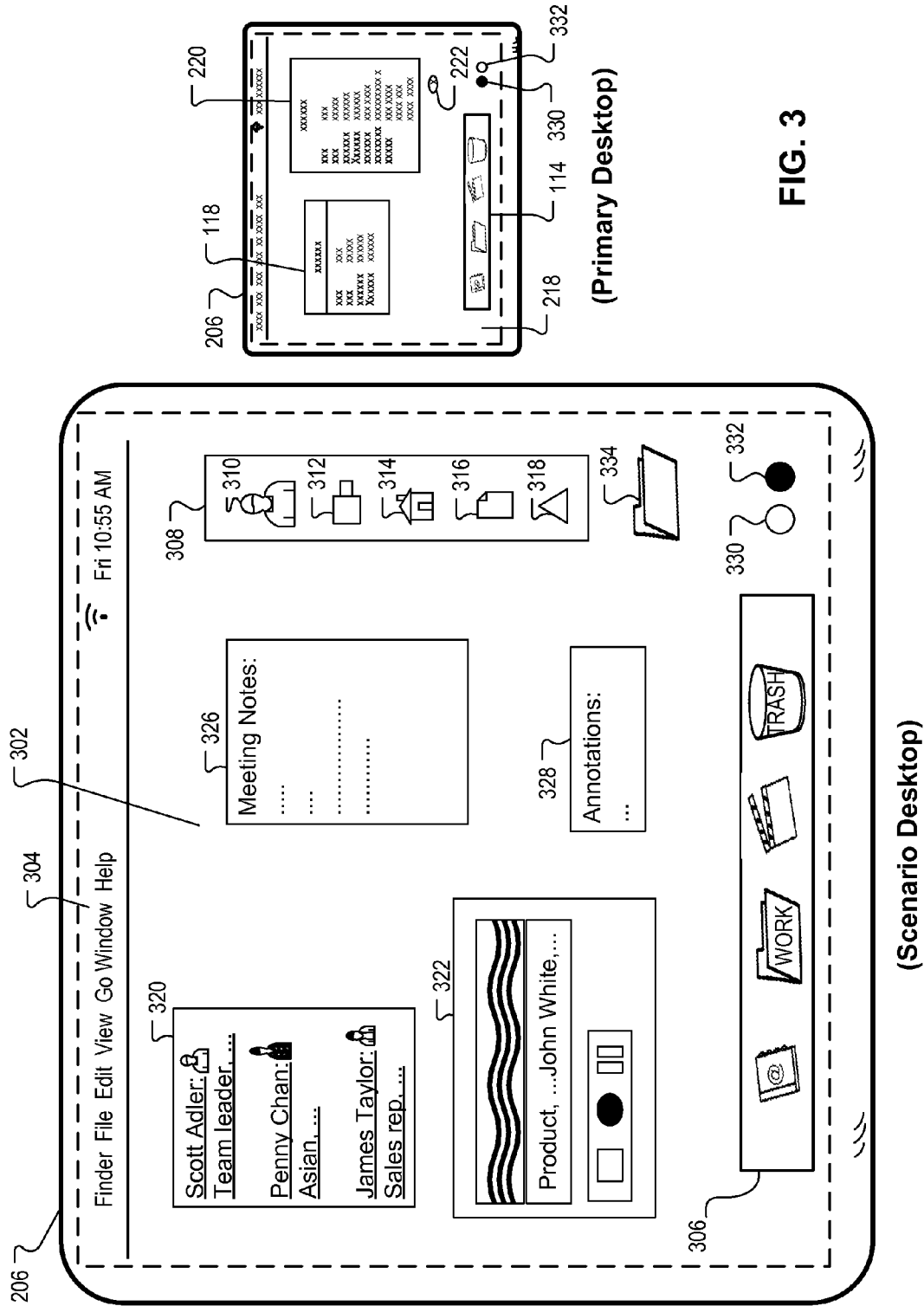
FIG. 3 illustrates an example scenario desktop for monitoring the recording of the example event scenario in FIG. 2.

FIG. 3 illustrates an example scenario-specific operating environment (e.g., scenario desktop 302) that is provided on the mobile device 206 upon detection of the event scenario shown in FIG. 2. The scenario desktop 302 can be an independent desktop co-existing with the primary desktop 218 (also called "the default system desktop 218") of the mobile device 206. In some implementations, the display of the mobile device 206 can exclusively present one desktop environment at a time, and the scenario desktop 302 and the primary desktop 218 can be switched in and out of the display in response to specific user inputs.

For example, on each of the primary desktop 218 and scenario desktop 302, one or more user interface elements (e.g., indicators 330 and 332) can be presented to indicate which desktop is currently displayed on the display of the mobile device 206. In this particular example, the indicator 330 represents the primary desktop 218 and the indicator 332 represents the scenario desktop 302. In some implementations, the user can touch and flick left or right on the touch-sensitive display of the mobile device 206 to switch between the primary desktop 218 and the scenario desktop 302. One of the indicators 330 and 332 can be highlighted to indicate which desktop is currently displayed on the mobile device 206.

In some implementations, the scenario desktop 302 can be a fully functional operating environment that provides all the functions available through the primary desktop 218. For example, the scenario desktop 302 can show a task bar 306 that includes the same display objects as the task bar 114 shown in the system desktop 114. Other functions that can be made available through the scenario desktop 302 can include, for example, search within the file system of the mobile device 206, invocation of various software applications installed on the mobile device 206, configuration of hardware and software components of the mobile device 206, access (e.g., opening, editing, creating, annotating, downloading, sharing, moving, deleting, etc.) to various documents (e.g., files, information items, webpages, folders and directories) stored on the mobile device 206 or retrievable from a remote server, and system operations (e.g., network configuration, process management, and other operating system level configurations, etc.).

In some implementations, the scenario desktop 302 can also provide a "cleaned" operating environment characterized by a presentation of no unorganized and/or extraneous information items (as might be associated with the primary desktop 218). For example, the primary desktop 218 may show scattered files and documents that are temporarily placed on the primary desktop 218, running software applications (e.g., email program 118) and processes, windows (e.g., notification 220), and other objects. These documents, windows, and other objects can be collected and placed at a designated location (e.g., folder 334 named "primary desktop folder") on the scenario desktop 302, such that the scattered documents and objects can be accessed through the scenario desktop 302 if needed, but do not create visual clutter or distraction to the user during the recording of the current event scenario.

In some implementations, the scenario desktop 302 can include various user interface elements for controlling the recording of various aspects of the current event scenario. These user interface elements can be placed within container object 306 on the scenario desktop 302. For example, the container object 306 can include participant control 310, audio/video recording control 312, location control 314, annotation control 316, and one or more other controls 318. In some implementations, the user can configure which controls are to be presented on the scenario desktop 302. For example, even though lighting and weather conditions can be monitored and recorded by the mobile device during the event scenario, the user may decide not to manually control these aspects of the recording, and hence exclude controls for these aspects from the container object 306 on the scenario desktop 302.

In some implementations, during the recording of the current event scenario, the user can invoke the participant control 310 to reveal participant control window 320 on the scenario desktop 302. The participant control window 320 can display the participants identified in the current event scenario by the mobile device 206, their respective identifiers (e.g., names, IDs, email addresses, etc.), functional labels (e.g., job title, role in the event scenario, etc.), and descriptive labels (e.g., gender, race, personal characteristics, etc.) obtained from various sources (e.g., device IDs, calendar entry, address book entry, audio transcript, facial/voice recognition from video/audio recordings, other information servers, etc.). In some implementations, the participant control user interface 320 can also display links to various data items related to the participants, such as their contact information and photos. In some implementations, the participant control user interface 320 can also allow the user to enter annotations about each participant. For example, the user can enter descriptive text (e.g., "moody," "concerned," "big boss," "new guy," etc.) for one or more of the participants. The descriptive text can be used as identifiers, functional and/or descriptive labels for the participants.

In some implementations, during recording of the event scenario, the user can invoke the audio/video recording control 312 to reveal audio/video control window 322 on the scenario 302. In some implementations, the audio/video recording control window 322 can include separate control elements for audio and video recordings. In some implementations, the audio/video recording control user interface can also include a control for capturing still images. In some implementations, these images, audio and video recordings can be streamed in real time to a remote server for storage and processing, or stored and processed locally on the mobile device. Using the control elements, the user can start, pause, or stop the recording at any time. The user can also mark particular segments of the recording, and provide real-time annotations for the particular segments of the recordings. In some implementations, a transcript can be generated and displayed in real time for the audio recording of the event scenario. In some implementations, the user can be given opportunity to annotate or make corrections to the audio transcript within the audio/video recording control window 322.

In some implementations, during recording of the event scenario, the user can invoke the location control 314 to reveal a location control window (not shown) on the scenario desktop 302. The location control window can display the location information that has been obtained by the positioning system on the mobile device, such as a set of geographical coordinates, a street address, and/or a room number. In some implementations, the location control user interface can also allow the user to enter functional and descriptive labels for the current location (e.g., "meeting room," "red walls," "smelly room," etc.).

In some implementations, the scenario desktop 302 can also include respective controls (e.g., control 318) for other sensory functions available on the mobile device 206. For example, an ambient light sensor can be used to determine the lighting condition. Lighting condition can potentially be used to determine the mood or ambience in the room. Some included sensors may detect characteristics of the surrounding environment such as the ambient temperature, air quality, humidity, wind flow, etc. Other sensors may detect the physical state of the mobile device, such as the orientation, speed, movement pattern, and so on.

In some implementations, during the recording of the event scenario, the scenario desktop can present annotation interface 328 for the user to enter keywords, and other descriptive labels for the current event scenario. For example, the user can enter text "a tough meeting" or "everyone seems excited" for the event scenario as a whole.

In addition to collecting information about the physical state of the mobile device and the surrounding environment, the device's location, the current time, and the people present nearby, the mobile device can also detect and record access to any documents through the scenario desktop 302 during the current event scenario. A document can be an individual file (e.g., a text or an audio file), a collection of linked files (e.g., a webpage), an excerpt of a file or another document (e.g., a preview of a text file, a thumbnail preview of an image, etc.), a summary of a file or another document (e.g., summary of a webpage embedded in its source code), a file folder, and/or an data record of a software application (e.g., an email, an address book entry, a calendar entry, etc.). A user of the mobile device 206 can access a document in a variety of manners, such as by opening, creating, downloading, sharing, uploading, previewing, editing, moving, annotating, executing, receiving or searching the document.

In the example scenario shown in FIG. 2, if the user of mobile device 206 performs operations through the scenario desktop 302, such as opening a file stored locally, viewing a webpage online, sharing a picture with the other participants, sending an email, making a call from the mobile device, looking up a contact, creating some notes (e.g., through word processing application interface 326), creating a file folder for the notes, changing the filename of an existing file, and executing a demo program, the file, the webpage, the picture, the email, the call log and phone number, the address book entry for the contact, the file folder, the file with its new name, and the demo program can all be recorded as documents accessed during the current event scenario. In some implementations, the particular mode of access is also recorded by the mobile device. For example, the MAC address of a particular access point for WiFi access could be recorded.

In this example, while recording of the event scenario continues, if the user switches from the scenario desktop 302 to the primary desktop 218 and accesses a number of documents through the primary desktop 218, these accesses through the primary desktop 218 need not be recorded for the current event scenario. Therefore, the separation and parallel existence of the scenario desktop 302 and the primary desktop 218 can offer the user the option to switch to the primary desktop 218 during an event scenario to work on something unrelated to the current event scenario, but without having the unrelated information associated with the current event scenario in a recording.

Creating an Information Bundle for the Event Scenario

A mobile device can obtain much information about an event scenario, either directly through built-in sensors, by processing recorded data, querying other data sources, by user's real-time annotations, or by sharing information with other devices. The different pieces of information can be associated with one another to form an information unit or information bundle for the event scenario. The information bundle includes not only a simple aggregation of data items associated with the event scenario, but also metadata that describe each aspect of the event scenario, where the metadata can be derived from the data items either individually or as a whole.

Figure 11:
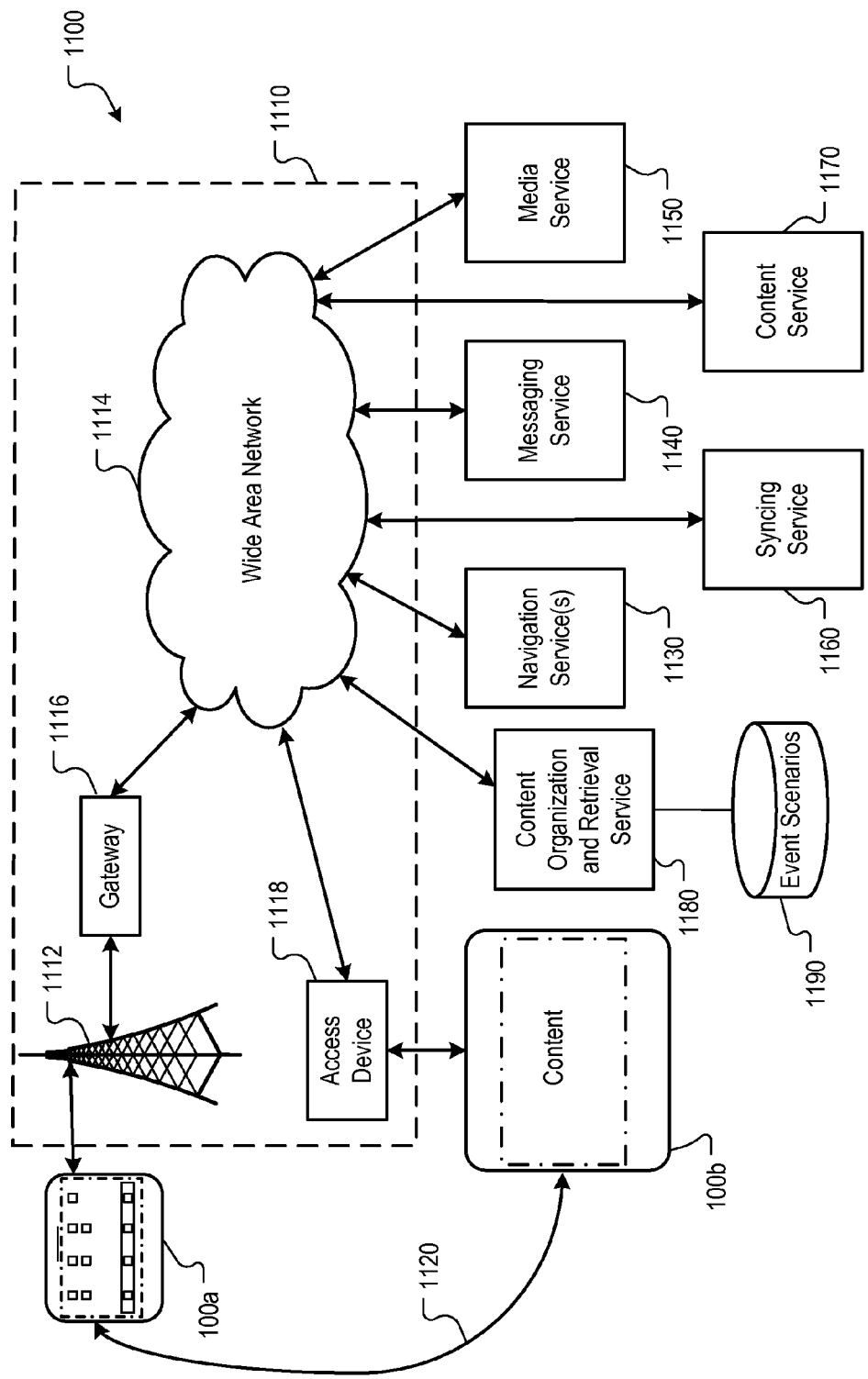
FIG. 11 is a block diagram of an example mobile device operating environment for scenario-based content presentation.

The creation of the information bundle can be carried out locally on the mobile device, remotely on a server, or partly on the mobile device and partly on the remote server (e.g., a server for the content organization and retrieval service 1180 shown in FIG. 11).

Figure 4:
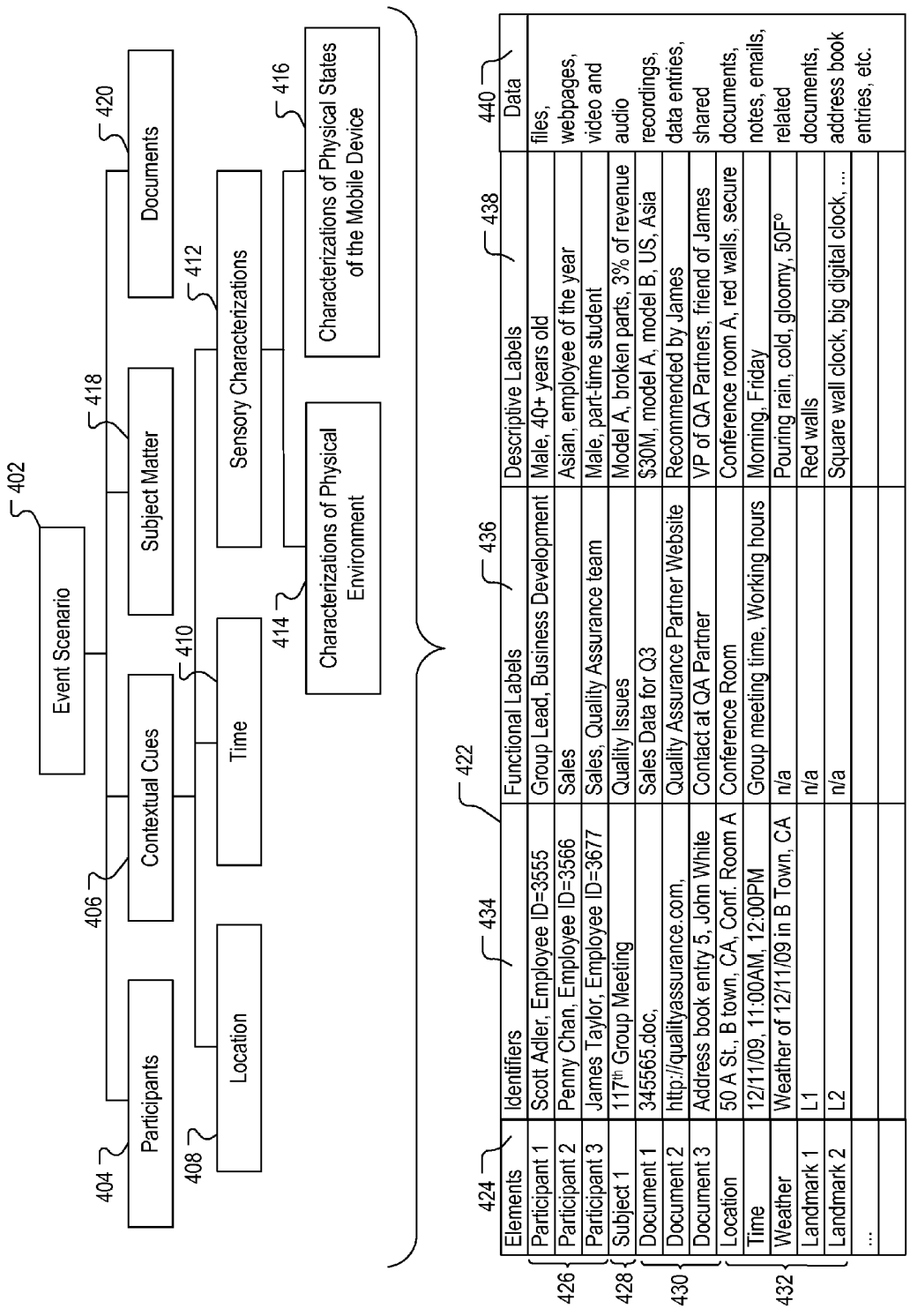
FIG. 4 illustrates creation of an example information bundle for the recorded event scenario.

FIG. 4 illustrates an example information bundle created for the event scenario shown in FIG. 2. Based on the recorded/collected information about the event scenario, metadata describing the event scenario can be generated. These metadata include, for example, respective identifiers, functional labels and descriptive labels for each aspect and sub-aspect of the event scenario, including the location, the time, the participants, the subject matter, and the documents associated with the event scenario. The recorded raw data, the processed data, the derived data, and the shared data about the event scenario (or collectively, "data items") can also be included in the information bundle for the event scenario.

As shown in FIG. 4, the example event scenario 402 is defined by one or more participants 404 present in the example event scenario 402 (locally and/or remotely). The example event scenario 402 is further defined by a plurality of contextual cues 406 describing the example event scenario 402. The contextual cues 406 include the location 408 and the time 410 for the event scenario 402, and various sensory characterizations 412. The various sensory characterizations 412 include characterizations 414 for the physical environment surrounding the mobile device and characterizations 416 for the physical states of mobile device, for example. Examples of the sensory characterizations 412 include the ambient temperature, the air quality, the visual landmarks, the audio landmarks, and the weather of the surrounding environment, the speed of the mobile device, and other perceivable information about the mobile device and/or its external physical environment.

In addition to the participants 404, the location 408, the time 410, and the various sensory characterizations 412, the event scenario 402 is also defined by one or more subject matter (or purpose) 418 for which the event scenario has occurred or came into being. The subject matter or purpose 418 can be determined through the calendar entry for the event scenario, or emails about the event scenario, keywords extracted from the conversations that occurred during the event scenario, and/or documents accessed during the event scenario. An event scenario may be associated with a single subject matter, multiple related subject matters, or multiple unrelated subject matters.

In addition, the event scenario 402 is associated with a collection of documents 420. The collection of documents associated with the event scenario 402 includes documents that were accessed or referred to during the event scenario 402. In some event scenarios, no documents may be physically accessed by the user, however, recordings and new data items about the event scenario are created by the mobile device. These recordings and new data items can optionally be considered documents associated with the event scenario. In some implementations, the mobile device may determine that certain documents are relevant based on the participants, the subject matter, the recordings and new data items created for the event scenario. These relevant documents can optionally be considered documents associated with the event scenario as well.

In order to create an information bundle (e.g., information bundle 422), metadata is generated automatically by the mobile device or by a remote server that receives the information (e.g., the data items 440) associated with the event scenario 402. The metadata include, for example, names/identifiers, functional labels, descriptive labels, and/or detailed descriptions of each element of the event scenario 402. The identifiers, functional labels, and descriptive labels can be extracted from the accessed documents, text transcripts of the recordings, image analysis, facial analysis, voice analysis, from other information servers, from information bundles of other related event scenarios, and so on.

Following the example shown in FIG. 2, the information bundle 422 can be created for the event scenario 402. In some implementations, the information bundle 422 can include data items 440 collected in real-time during the event scenario 402. The data items 440 can include, for example, files, web pages, video and audio recordings, images, data entries in application programs (e.g., email messages, address book entry, phone numbers), notes, shared documents, GPS locations, temperature data, traffic data, weather data, and so on. Each of these data items are standalone data items that can be stored, retrieved, and presented to the user independent of other data items. The data items 440 can include data items that existed before the start of the event scenario 402, or created or obtained by the mobile device during the event scenario 402. In some implementations, the data items 402 can also include data items that are generated or obtained immediately after the event scenario 402, such as shared meeting notes, summary of the meeting, transcripts of the recordings, etc.

For each aspect and sub-aspect (e.g., elements 424) of the event scenario 402 depicted in the information bundle 422, such as participants 426, subject matter 428, associated documents 430, and contextual cues 432, one or more identifiers 434 can be derived from the data items 440 or other sources.

For example, for each participant, the identifiers can include a name, an employee ID, an alias, and/or an email address of the participant. These identifiers are used to uniquely identify these participants. The identifiers for the subject matter can be the subject line (if unique) of the calendar entry for the meeting. The identifiers for the subject matter are unique keys for identifying the subject matter of the event scenario. In some cases, a unique identifier can be generated and assigned to the subject matter.

In this example, three documents were accessed through the scenario desktop 302 during the event scenario 402. Depending on the document type, the identifiers for each of these documents can be a filename, a uniform resource location (URL) of the document (e.g., a webpage), an address book entry identifier, an email message identifier, and so on. The identifiers for a document uniquely identify the document for retrieval.

For a location, the identifier can be a street address, a set of geographical coordinates, a building name, and/or a room number. In some implementations, depending on what the location is, the identifier can be a store name, station name, an airport name, a hospital name, and so on. The identifiers of the location uniquely identify the location at which the event scenario has occurred.

For the time associated with the event scenario 402, the identifier can be a date and a time of day, for example. For other contextual cues, the identifiers can be used to uniquely identify those contextual cues. For example, for the "weather" element of the event scenario, the identifier can be "weather on 12/11/09 in B town," which uniquely identifies the weather condition for the event scenario. For other contextual cues, such as a visual landmark, the identifier can be automatically generated (e.g., "L1" or "L2") for uniquely identifying the landmarks in the event scenario 402.

In addition to identifiers 434, each aspect and sub-aspect (e.g., the elements 424) of the event scenario 402 can also be associated with one or more functional labels 436. The functional labels 436 describe one or more functions of the participants, subject matters, documents, location, time, and/or other contextual cues. For example, a functional label of a participant can be a professional title of the participant, the participant's role in the event scenario, and so on. The functional label of a subject matter can be the particular purpose of the event or gathering, an issue to be addressed during the event scenario, and so on. The functional label for a document can be a functional characterization of the content of the document, particularly in the context of the event scenario. For example, a function label for a document can be "a sales report," "a product brochure," "promotional material," "a translation," and so on.

Each functional label characterizes a function or purpose of an aspect of the event scenario, particularly in the context of the event scenario. A functional label does not have to be uniquely associated with any particular data item or identifier. A search using a functional label may return more than one participant, locations, documents, etc. in the same or different event scenarios.

In addition to identifiers 434 and functional labels 436, a number of descriptive labels 438 can also be associated with each aspect or sub-aspect (the elements 424) of the event scenario 402. For example, each participant can be associated with one or more descriptive labels. These descriptive labels are descriptions that an observer of the event scenario is likely to use to describe the participants, e.g., in physical appearances, reputation, characteristics, and so on. For another example, the descriptive labels associated with a document can include keywords associated with the document, keywords describing a feature of the document (e.g., funny, well-written), and so on.

In some implementations, descriptive labels can also be associated with other contextual cues. For example, in addition to the functional label of the location for the event scenario, a number of descriptive labels can be associated with the location as well. For example, if the conference room A is also known as the "red room" because it has red walls, then the keyword "red walls" can be associated with the location as a descriptive label.

The information bundle 422 can be stored locally at the mobile device or remotely at a central server. Alternatively, the metadata for many event scenarios can be put into an index stored at the mobile device or the remote server, while the data items and/or associated documents are stored at their original locations in the file system (either on the mobile device or the remote server).

Presenting Content from a Related Event Scenario in a Content Desktop

After an information bundle has been created for an event scenario, and stored either locally at the mobile device or remotely at a central server, the information bundle, or the documents and data items referenced in the information bundle can be automatically retrieved and presented to the user of the mobile device (e.g., during a current event scenario that is related to the previously recorded event scenario). In some implementations, a separate content desktop can be presented for each retrieved information bundle in parallel with the primary desktop and the scenario desktop for the current event scenario. In some implementations, one desktop is presented on the display of the mobile device at a time, and each of the content desktop(s), the scenario desk, and the primary desktop can be switched in and out of the display in response to user inputs. While reference is made to presenting an information bundle at the time of a related current scenario, an information bundle can be independently retrieved and presented as desired as will be discussed below in association with a query.

Figure 5:
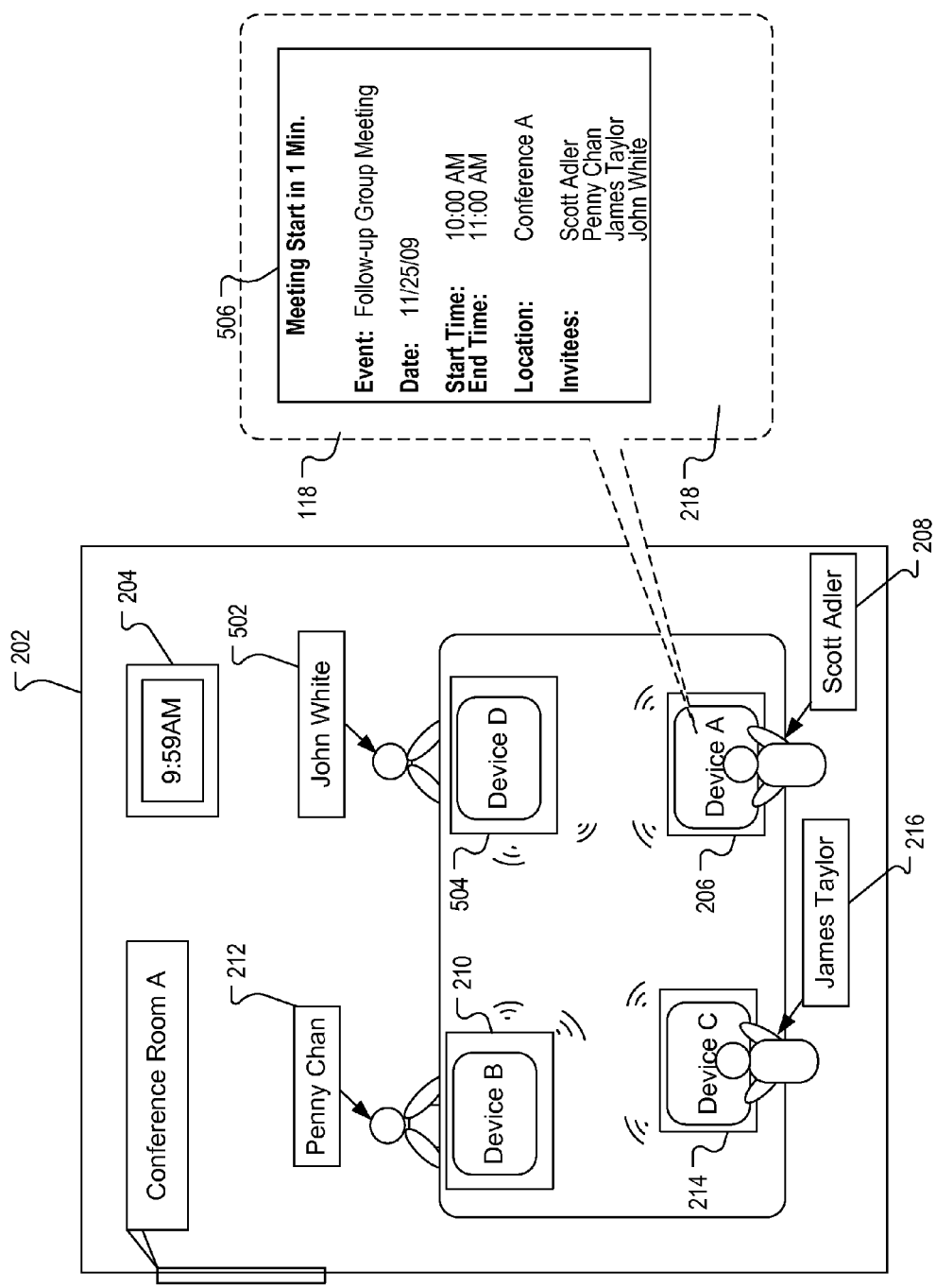
FIG. 5 illustrates detection of a subsequent, related event scenario of the recorded event scenario.

FIG. 5 shows a related event scenario for the previously recorded event scenario shown in FIG. 2. The relatedness of two event scenarios can be determined by the mobile device based on a number of indicators. Each of the indicators for detecting an event scenario described above can also be used to detect the start of the subsequent, related event scenario as well.

For example, when an event notification is generated and presented on a mobile device indicating the imminent start of a scheduled calendar event, the mobile device can determine whether the scheduled event relates to any previously recorded events. If the event notification refers to a previous scheduled event, then the previous and the current events can be considered related events, and the two event scenarios can be considered related event scenarios. Therefore, at the start of the current event scenario, the mobile device can automatically retrieve the information bundle associated with the previous event scenario, and present information and data items (e.g., documents) associated with the previous event scenario on the mobile device.

In some implementations, a related event scenario can be detected based on one or more common elements appearing in the current and previously recorded event scenarios. The criteria for recognizing a related event scenario based on common elements can be specified by the user of the mobile device. For example, the user can specify that two event scenarios are considered related if they share the same group of participants. For another example, two event scenarios can be considered related if they have the same subject matter (e.g., as determined from the calendar notifications). For yet another example, two event scenarios can be considered related if they have the same location (e.g., two visits to the doctor's office). Other automatically detectable indicators can be specified to relate two event scenarios.

In some implementations, when the mobile device determines that a current event scenario is related to a previously recorded event scenario, the mobile device automatically retrieves the information bundle(s) associated with the previously recorded event scenario(s), and presents the content and information available in the retrieved information bundle(s) on the mobile device without explicit user request.

Figure 6:
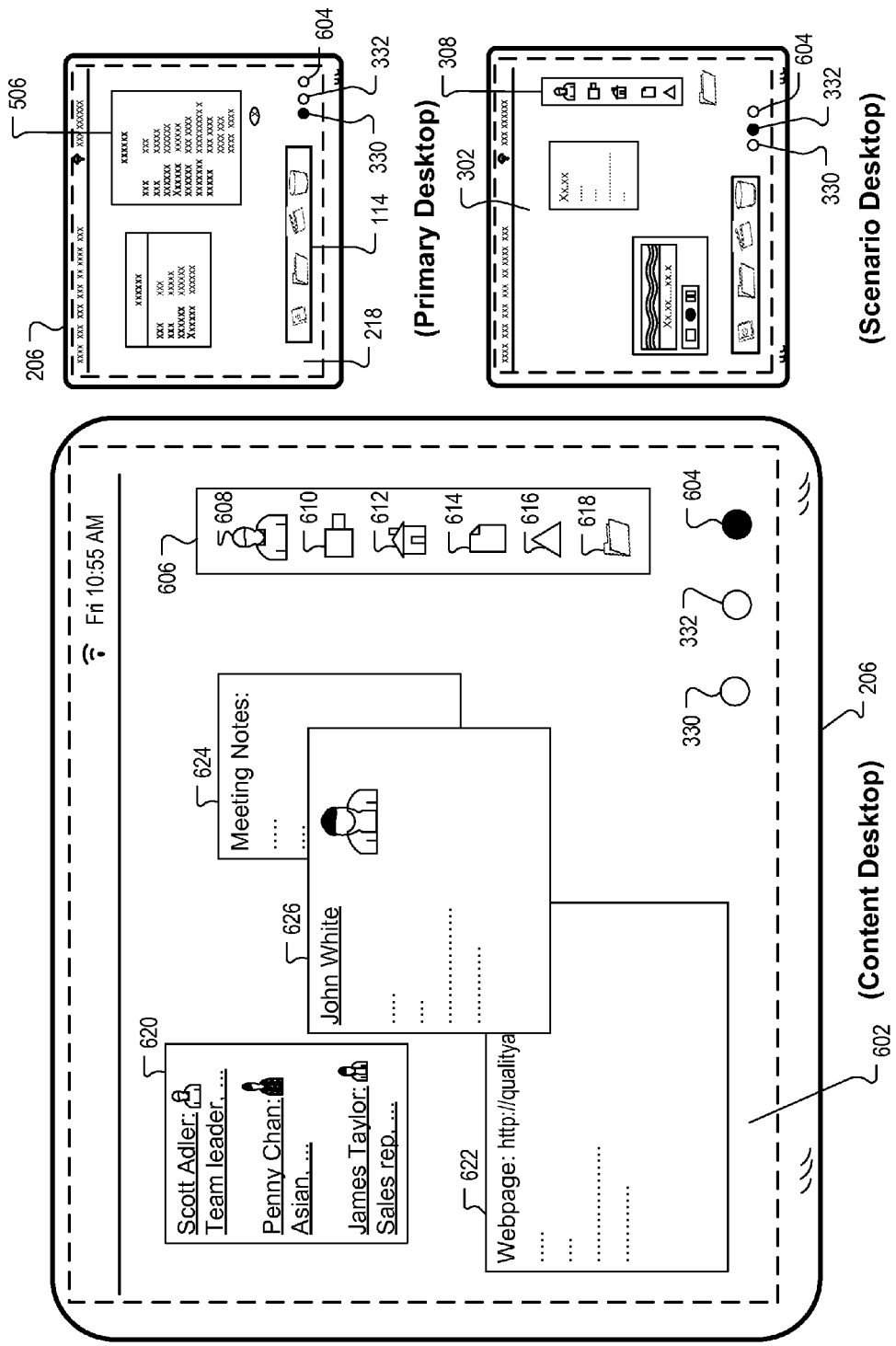
FIG. 6 illustrates an example content desktop for presenting content associated with the recorded event scenario during the subsequent, related event scenario shown in FIG. 5.

FIG. 5 illustrates detection of the related event scenario for the previously recorded event scenario shown in FIG. 2, and FIG. 6 illustrates the presentation of content from the retrieved information bundle on the mobile device (e.g., on content desktop 602).

Following the event scenario (e.g., the group meeting) shown in FIG. 2 and the creation of the information bundle 422 shown in FIG. 4, a follow-up meeting was scheduled and is about to occur in the same conference room A. In this scenario, a business contact (e.g., John White 502) that was mentioned in the previous meeting was invited to join this follow-up meeting. Close to the scheduled start of the follow-up meeting, event notification 506 is generated and presented (e.g., on the primary desktop 218) on the mobile device 206. In this event scenario, the new participant John White 502 can also carry a mobile device (e.g., device 504).

In this example, a corresponding event scenario for the follow-up meeting can be detected based on the methods similar to that described with respect to the detection of the event scenario associated with the first group meeting. The scenario desktop 302 for monitoring and recording the current event scenario (e.g, the follow-up meeting shown in FIG. 5) can be provided on the mobile device 206 (as shown in FIG. 6), with controls for recording the current event scenario (e.g., controls in the container object 308).

Upon retrieval of the information bundle of the previously recorded, related event scenario, the mobile device 206 can provide access to the content in the retrieved information bundle through the content desktop 602. More than one content desktop can be provided in parallel, if information bundles from multiple related, previously recorded event scenarios have been identified.

In some implementations, the content desktop 602 can be a simplified desktop that does not provide all the functions available through the primary and/or scenario desktops. Instead, the content desktop 602 can provide access only to information and content that are recorded about the previous event scenario. In some implementations, the content desktop 602 can also provide access to information and content that is retrievable based on the information recorded about the previously recorded event scenario. By limiting the content available through the content desktop 602, the user can clearly distinguish the content that was accessed during a previously recorded event scenario from the content that is accessed during the current event scenario.

In this example, indicator 604 can be presented along with the indicators 330 and 332 for the primary and the scenario desktops on the display of the mobile device 206. The indicator 604 indicates that content from a previously recorded event scenario has been retrieved and available for viewing. The user can switch to the content desktop 602 by, for example, touch and flick to the left or right on the touch-sensitive display of the mobile device 206.

In some implementations, the content desktop 602 can include a plurality of user interface elements for accessing information and data items associated with various aspects and sub-aspects of the previously recorded event scenario.

For example, container object 606 includes display object 608 for invoking interface 620 showing information and/or data items about the participants of the previously recorded event scenario. The container object 606 can also include display object 610 for invoking an interface showing information and/or data items about the audio and video recordings of the previously recorded event scenario. In some implementations, the container object 606 can also include display object 610 for invoking an interface showing information and/or data items about the location of the previously recorded event scenario. The container object 606 can also include one or more other display objects (e.g., display object 616) for invoking interface(s) for information and/or data items related to other aspects and sub-aspects of the previously recorded event scenario. In some implementations, the container object 606 can also include display object 618 for opening a folder showing documents (or links to the documents) that were accessed during the previously recorded event scenario.

In some implementations, the documents and data items accessed through the content desktop during a subsequent event scenario can be automatically included in the information bundle of the subsequent event scenario. In some implementations, the user can manually specify which of the documents and data items available in the content desktop should be added to the information bundle associated with the subsequent event scenario. In some implementations, the user can drag a particular document or data item to a dedicated location (e.g., the indicator 332) on the content desktop 602 to indicate that the particular document or data item is to be added to the information bundle associated with the subsequent event scenario.

Presenting Content in Response to Scenario-Based Queries

In addition to the automatic retrieval and presentation of content from a previously recorded event scenario during a subsequent, related event scenario, content associated with a recorded event scenario can also be presented in response to a scenario-based search query.

A scenario-based search query can be a search query containing terms that describe one or more aspects of the event scenario. Scenario-based search queries are helpful when the user wishes to retrieve documents that are relevant to a particular context embodied in the event scenario. For example, a search query that includes a functional label "doctor's visit" can result in retrieval and presentation of information bundles associated with multiple recorded doctor's visits. Sometimes, the user may remember nothing about the content of a document, but remembers the specific context that the document was accessed. A query that specifies a suitable contextual cue can help retrieve the document, even if there is no logical connection between the contextual cue and the content of the document.

Figure 7:
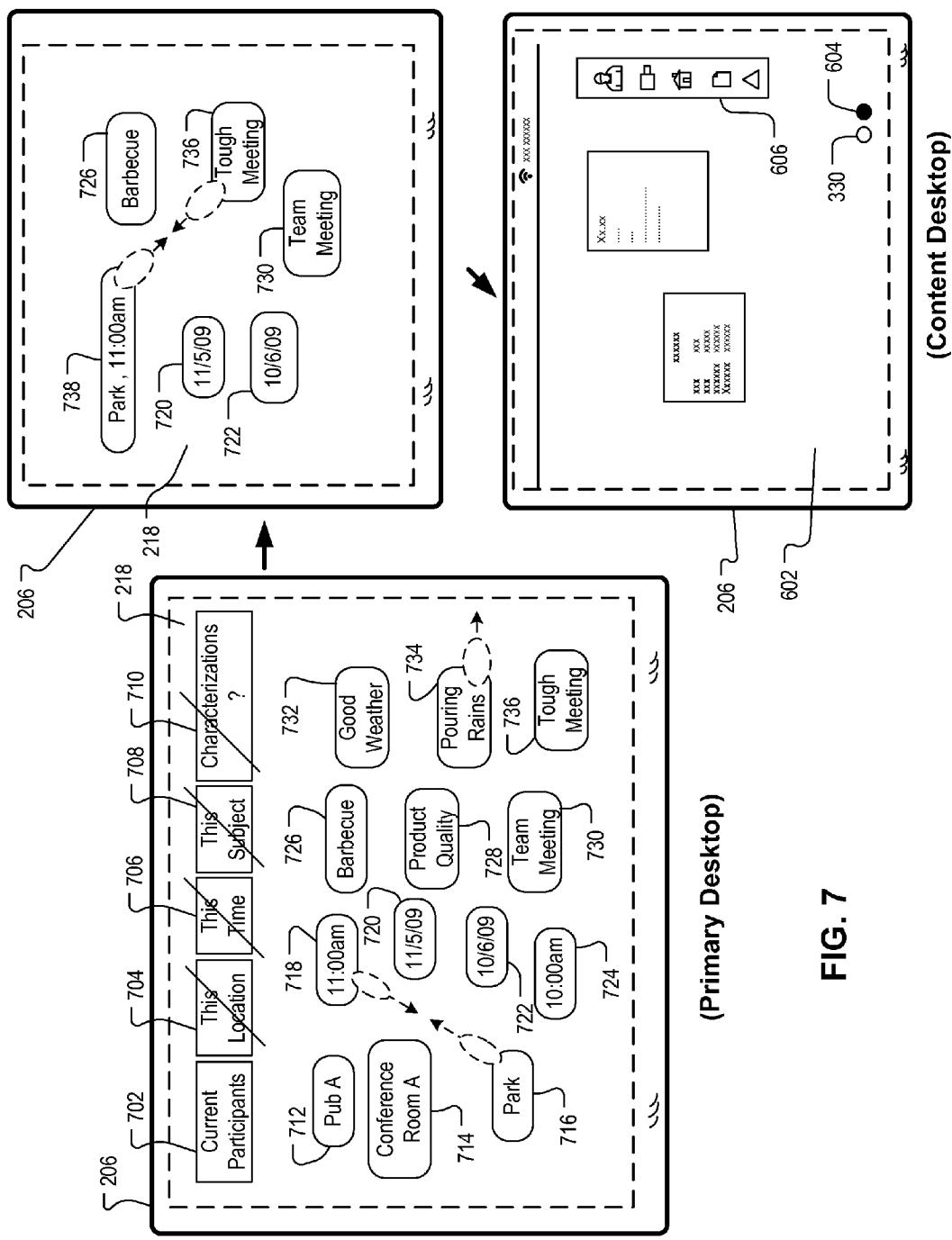
FIG. 7 illustrates an example user interfaces for scenario-based content search and retrieval.

FIG. 7 illustrates example user interfaces for retrieving and presenting content from information bundles in response to scenario-based queries.

In some implementations, the user can invoke a search function on the mobile device (e.g., on the primary desktop 218). In response to the user input, a plurality of search fields can be presented, for example, on the primary desktop 218 of the mobile device 206. The plurality of search fields can include one or more elements of the information bundle, such as the participants, the location, the time, the subject matter, the documents, and/or other characterizations of an event scenario. In some implementations, the plurality of fields can be automatically populated with the contextual cues that are currently present, such as the participants present in proximity to the mobile device, the current location, the current time, the subject matter being discussed at the moment, and/or other characterizations that are currently detected by the mobile device (e.g., according to the various techniques described with respect to detection and recording of an event scenario).

In FIG. 7, the plurality of fields shows the automatically presented and populated search fields, including participant field 702, location field 704, time field 706, subject field 708, and one or more other characterization field(s) 710. Each of the fields is automatically filled with information available about the current scenario occurring in proximity to the mobile device. The user can selectively remove certain fields from the query, for example, by touching and swiping across the unwanted search criteria (e.g., search fields 704, 706, 708, and 710). In some implementations, the user can enter new keywords, functional labels, and/or descriptive labels for each of the search fields to complete the query.

In this example, after the user has eliminated the location, time, subject, and other characterization search fields from the query, the mobile device performs the search using only the remaining search field(s) (e.g., "the current participants"). If there have been a number of previously recorded event scenarios with the same group of participants, information bundles for these previously recorded event scenarios can be identified. At this point, the user can either request to see all the identified information bundles or further narrow the search by entering additional search criteria.

In some implementations, the mobile device can process the metadata associated with the identified information bundles to identify a number of differentiating elements about these identified information bundles. These differentiating elements are identifiers and/or labels that distinguish one subset of the identified information bundles with another, different subset of the identified information bundles.

Once the mobile device has identified these differentiating elements, these differentiating elements can be presented on the mobile device (e.g., on the primary desktop 218). In this example, a number of differentiating elements are found in the plurality of identified information bundles. These differentiating elements can be for different aspects of the recorded event scenarios. For example, the differentiating elements for the identified information bundles include, location identifier 712 ("Pub A"), location identifier 714 ("Conference Room A"), functional label 716 ("Park"), time identifier 718 ("11: 00 am"), time identifier 720 ("11/5/09"), time identifier 722 ("10/6/09"), time identifier 724 ("10:00 am"), functional label 726 ("Barbecue"), functional label 728 ("Product Quality"), functional label 730 ("Team Meeting"), descriptive label 732 ("Good Weather"), descriptive label 734 ("Pouring Rains"), and descriptive label 736 "Tough Meeting."

In some implementations, each of the differentiating elements can be presented by a respective user interface element (e.g., a respective icon showing the identifier and/or label text) on the primary desktop 218. In some implementations, only a subset of the distinguishing elements is presented if too many distinguishing elements are identified. The subset of the distinguishing elements can be selected based on the number of information bundles that are associated with each distinguishing element.

In some implementations, the user after seeing these distinguishing elements may remember additional details about the particular event scenario that he wishes to recall. At this point, the user can either enter additional search criteria in the search fields and/or select one or more of the displayed distinguishing elements, to narrow the search. In some implementations, the user can combine two distinguishing elements to narrow the search to a set of information bundles that satisfy both of the distinguishing elements. In some implementations, the user can touch and drag the user interface elements for the two distinguishing elements toward each other to combine them. These selected distinguishing elements become additional search criteria for the query, and the information bundles that do not satisfy both of these distinguishing elements are excluded from further consideration for the search. In some implementations, the user can touch and flick a particular distinguishing element (e.g., element 734) toward the edge of the display, and exclude information bundles that have the particular distinguishing element from further consideration.

After the user has selected and combined some distinguishing elements, and discard some distinguishing elements, the mobile device can process the remaining information bundles to find a reduced set of distinguishing elements among the remaining information bundles. For example, the remaining elements in this example are the time identifier 720 ("11/5/09"), the time identifier 722 ("10/6/09"), the functional label 726 ("Barbecue"), the descriptive label 736 ("Tough Meeting"), and the functional label 730 ("Team Meeting"). A new combined label 738 for the combination "Park, 11:00 am" can be generated and presented on the mobile device 206. If the user further combines the combination 738 with the descriptive label 736, a single information bundle can be identified to satisfy all of these search criteria (e.g., "current participants," "Park," "11:00 am," and "Tough Meeting").

Once a reasonably small set (e.g., less than three) of information bundles have been identified, the mobile device can present information and data items from the identified information bundles in their respective content desktops (e.g., the content desktop 602). In some implementations, the search results can be presented in a designated folder on the primary desktop.

Example Processes for Scenario-Based Content Presentation

FIG. 8 is a flow diagram of an example process 800 for presenting a scenario desktop for recording a current event scenario. mobile device, a first event scenario is detected (e.g., presently occurring in proximity to the mobile device). For example, the first event scenario can be defined by one or more participants and one or more contextual cues concurrently monitored by the mobile device and observable to a user of the mobile device (820). In response to detecting the first event scenario and without requiring further user input, an alternate, scenario desktop can be presented on the display of the mobile device in place of the primary desktop (830). User input accessing one or more documents through the scenario desktop can be received during the first event scenario (840). An information bundle associated with the first event scenario can be created, where the information bundle includes respective data identifying, for example, the one or more participants, the one or more contextual cues, and the one or more documents that are accessed by the user through the scenario desktop (850).

In some implementations, to detect the first event scenario, first user input can be received on a touch-sensitive display, where the first user input indicates a start of the first event scenario. In some implementations, to detect the first event scenario, a current location of the mobile device can be determined, a current time can be determined, and notification of a scheduled calendar event can be received on the mobile device, where the notification indicates an imminent start of the scheduled calendar event at the current location of the mobile device. In some implementations, to detect the first event scenario, a current time can be determined, one or more persons present in proximity to the mobile device can be identified; and notification of a scheduled calendar event can be received on the mobile device, where the notification indicates an imminent start of the scheduled calendar event and that the identified one or more persons are participants of the scheduled calendar event.

In some implementations, the one or more contextual cues concurrently monitored by the mobile device and observable to a user of the mobile device can include one or more of a current location, a current time, and a sensory characterization of an environment surrounding the mobile device. In some implementations, the sensory characterization of the environment surrounding the mobile device can include one or more of a temperature reading, a weather report, identification of a visual landmark present in the environment, and identification of an audio landmark present in the environment.

In some implementations, respective user interface elements for monitoring the one or more participants and the one or more contextual cues can be presented on the scenario desktop.

In some implementations, to create the information bundle, respective identifiers, functional labels, and/or descriptive labels can be derived for at least one the one or more participants, contextual cues, or documents, and the information bundle can be created and retrievable based on one or more of the derived identifiers, functional labels, and/or descriptive labels. In some implementations, the information bundle further can include content copied from the one or more documents and content recorded during the first event scenario.

Figure 9:
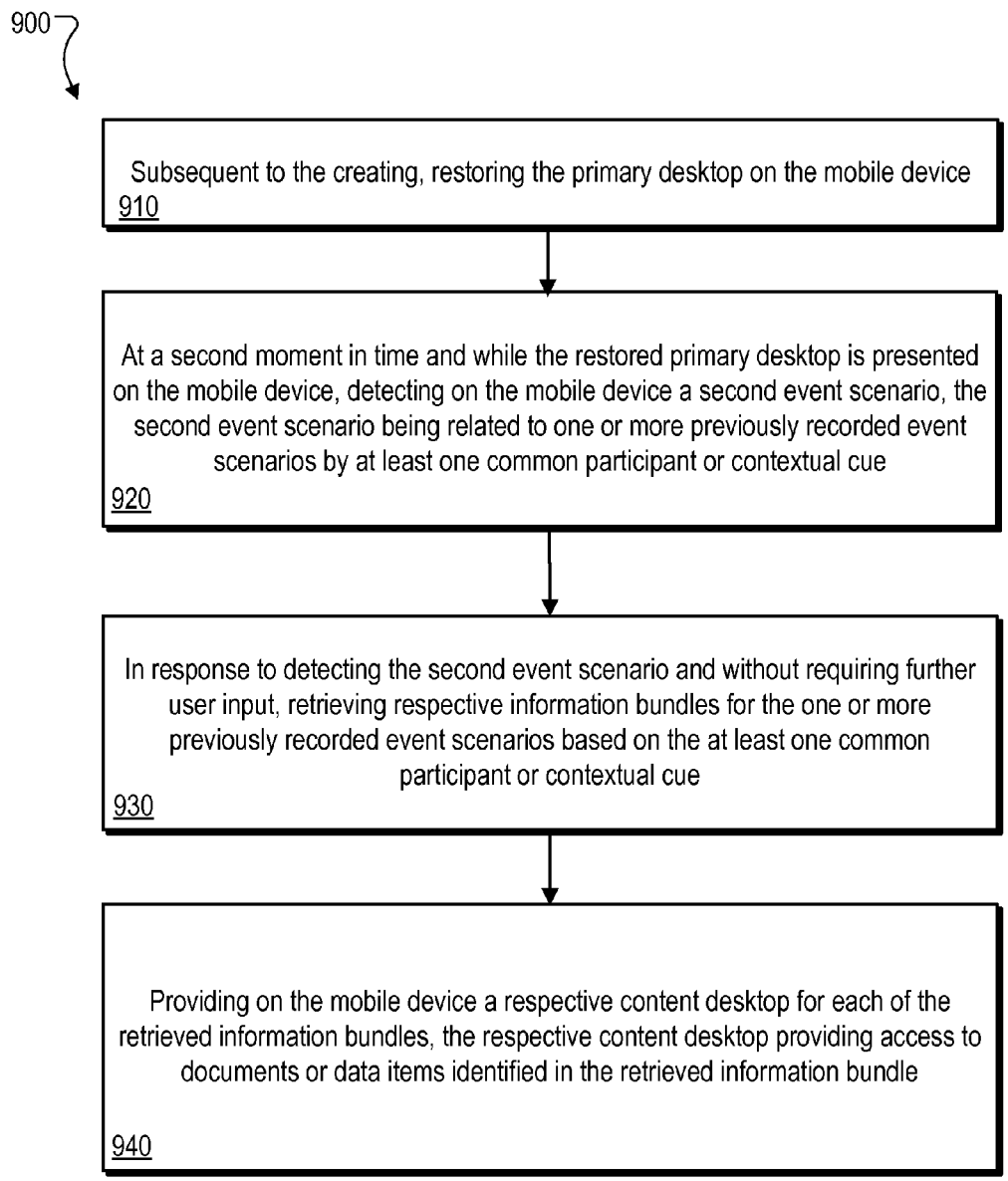
FIG. 9 is a flow diagram for an example process for providing a content desktop showing content associated with the recorded event scenario during a subsequent, related event scenario.

FIG. 9 is a flow diagram for an example process 900 for providing a content desktop showing content associated with the recorded event scenario during a subsequent, related event scenario. In some implementations, the example process 900 can continue from the example process 800.

In some implementations, the primary desktop can be restored on the mobile device (910). At a second moment in time and while the restored primary desktop is presented on the mobile device, a second event scenario can be detected (e.g., presently occurring in proximity to the mobile device), where the second event scenario is related to one or more previously recorded event scenarios by, for example, at least one common participant or contextual cue (920). In response to detecting the second event scenario and without requiring further user input, respective information bundles for the one or more previously recorded event scenarios can be retrieved (e.g., based on the at least one common participant or contextual cue) (930). A respective content desktop for each of the retrieved information bundles can be provided on the mobile device, where the respective content desktop provides access to documents and/or data items identified in the retrieved information bundle (940).

In some implementations, the primary desktop and each of the content desktops can be switchable in the display of the mobile device in response to user input.

In some implementations, a second scenario desktop for the second event scenario is provided on the mobile device, where the primary desktop, the scenario desktop, and the content desktop can be switchable in the display of the mobile device in response to user input.

In some implementations, each of the content desktops can provide a link to the second scenario desktop for associating a document accessible in the content desktop with the second event scenario.

In some implementations, the first event scenario can be associated with a first scheduled calendar event, and the second event can be associated with a second scheduled calendar event related to the first calendar event.

In some implementations, a query indicating at least one of the one or more of the contextual cues can be received on the mobile device. The information bundle associated with the first event scenario can be retrieved based on the contextual cues indicated in the received query. A content desktop for the retrieved information bundle can be presented on the mobile device, where the respective content desktop is for accessing documents or data items associated with the retrieved information bundle.

Figure 10:
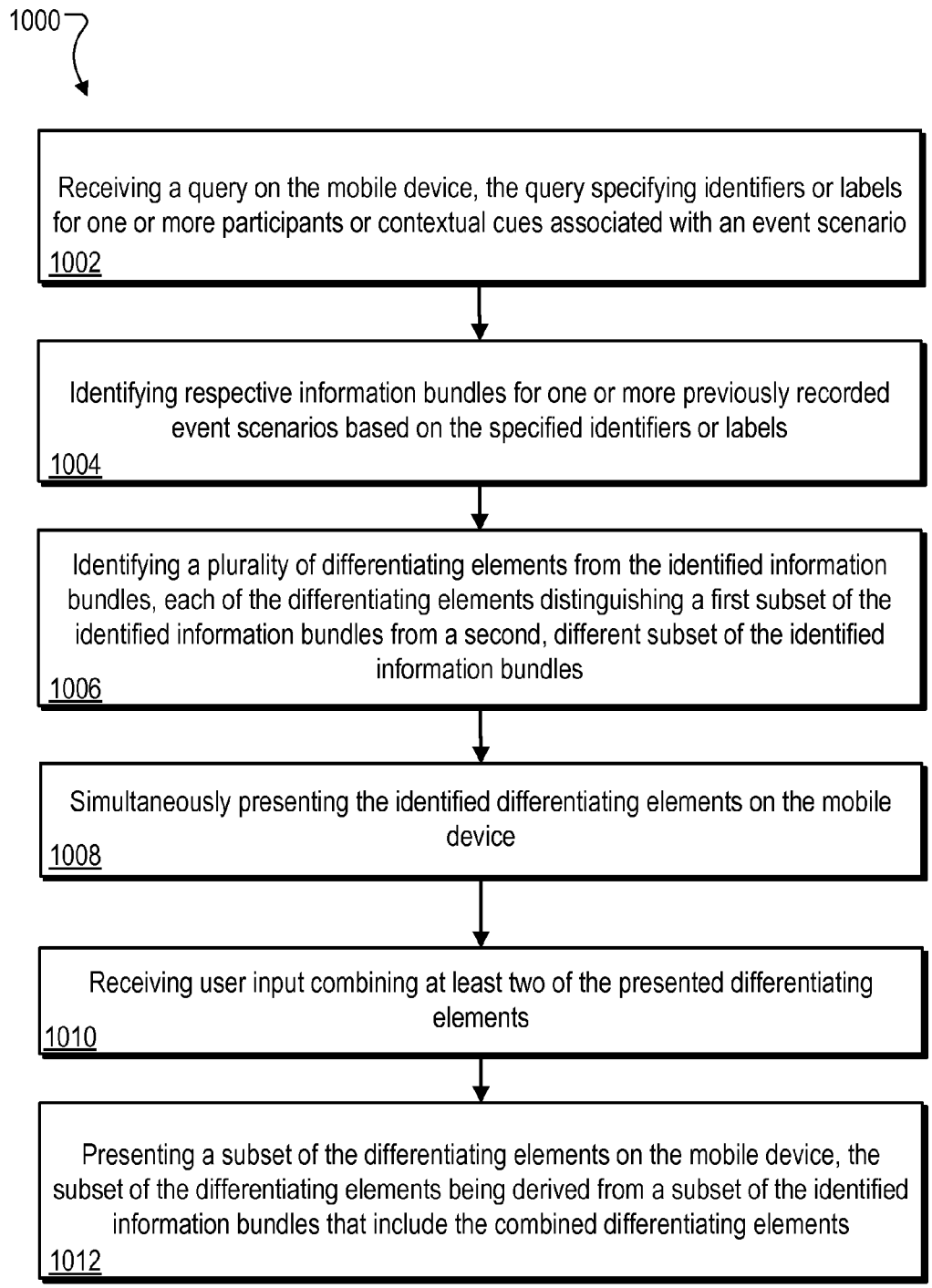
FIG. 10 is a flow diagram of an example process for presenting user interfaces for scenario-based content search and retrieval.

FIG. 10 is a flow diagram of an example process 1000 for presenting user interfaces for scenario-based content search and retrieval. In some implementations, the example process 1000 can follow the example processes 800 and/or 900. In some implementations, example process 1000 can be performed independently of example processes 800 and/or 900.

In some implementations, a query can be received on the mobile device, where the query specifies identifiers and/or labels for one or more participants and/or contextual cues associated with an event scenario (1002). Respective information bundles for one or more previously recorded event scenarios can be identified based on the specified identifiers or labels (1004). A plurality of differentiating elements can be identified from the identified information bundles, where each of the differentiating elements distinguishes a first subset of the identified information bundles from a second, different subset of the identified information bundles (1006). The identified differentiating elements can be simultaneously presented on the mobile device (1008). User input combining at least two of the presented differentiating elements can be received (1010). In response to the user input, a subset of the differentiating elements can be presented on the mobile device, where the subset of the differentiating elements are derived from a subset of the identified information bundles that include the combined differentiating elements (1012).

In some implementations, the user input combining the at least two of the presented differentiating elements includes simultaneously touching and dragging the differentiating elements toward one another on a touch-sensitive display of the mobile device.

In some implementations, one of the subset of identified information bundles can be selected based on the specified identifiers and/or labels in the query, and the combined differentiating elements. Access to documents or data items associated with the selected information bundle can be provided on a content desktop of the mobile device, where the content desktop exists in parallel with a primary desktop of the mobile device, and is switchable to the primary desktop in response to user input.

Example Network Operating Environment

FIG. 11 is a block diagram 1100 of an example of a mobile device operating environment. The mobile device 100 of FIG. 1 (shown as 100*a* or 100*b* here) can, for example, communicate over one or more wired and/or wireless networks 1110 in data communication. For example, wireless network 1112 (e.g., a cellular network), can communicate with wide area network (WAN) 1114, such as the Internet, by use of gateway 1116. Likewise, access device 1118, such as an 802.11g wireless access device, can provide communication access to the wide area network 1114. In some implementations, both voice and data communications can be established over the wireless network 1112 and the access device 1118. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 1112, gateway 1116, and wide area network 1114 (e.g., using TCP/IP or UDP protocols). Likewise, in some implementations, the mobile device 100b can place and receive phone calls, send and receive e-mail messages, and retrieve electronic documents over the access device 1118 and the wide area network 1114. In some implementations, the mobile device 100b can be physically connected to the access device 1118 using one or more cables and the access point 1118 can be a personal computer. In this configuration, the mobile device 100 can be referred to as a "tethered" device.

The mobile devices 100a and 100b can also establish communications by other means (e.g., wireless communications). For example, the mobile device 100a can communicate with other mobile devices (e.g., other wireless devices, cell phones, etc.), over the wireless network 1112. Likewise, the mobile devices 100a and 100b can establish peer-to-peer communications 1120 (e.g., a personal area network), by use of one or more communication subsystems (e.g., a Bluetooth™ communication device). Other communication protocols and topologies can also be implemented.

The mobile device 100a or 100b can, for example, communicate with one or more services (not shown) over the one or more wired and/or wireless networks 1110. For example, navigation service 1130 can provide navigation information (e.g., map information, location information, route information, and other information), to the mobile device 100a or 100b. Access to a service can be provided by invocation of an appropriate application or functionality on the mobile device. For example, to invoke the navigation service 1130, a user can invoke a Maps function or application by touching the Maps object. Messaging service 1140 can, for example, provide e-mail and/or other messaging services. Media service 1150 can, for example, provide access to media files, such as song files, movie files, video clips, and other media data. Syncing service 1160 can, for example, perform syncing services (e.g., sync files). Content service 1170 can, for example, provide access to content publishers such as news sites, RSS feeds, web sites, blogs, social networking sites, developer networks, etc. Data organization and retrieval service 1180 can, for example, provide scenario-based content organization and retrieval service to mobile devices, and store information bundles and other information for the event scenarios (e.g., in database 1190). Other services can also be provided, including a software update service that automatically determines whether software updates exist for software on the mobile device, then downloads the software updates to the mobile device where it can be manually or automatically unpacked and/or installed. Other services such as location-sharing services can also be provided.

Example Mobile Device Architecture

Figure 12:
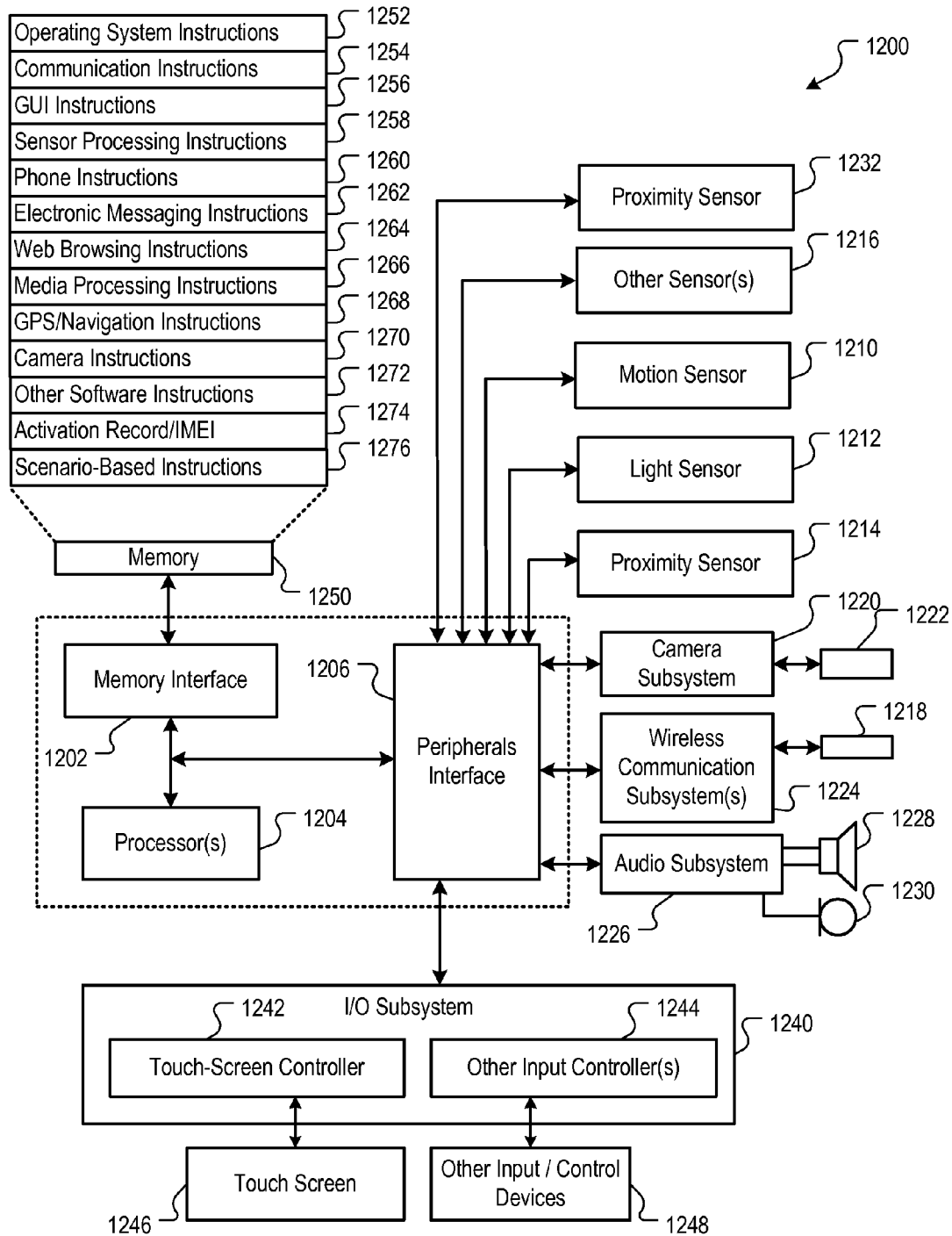
FIG. 12 is a block diagram of an example implementation of the mobile device for performing scenario-based content presentation.

FIG. 12 is a block diagram 1200 of an example implementation of the mobile device 100 of FIG. 1. The mobile device 100 can include memory interface 1202, one or more data processors, image processors and/or central processing units 1204, and peripherals interface 1206. The memory interface 1202, the one or more processors 1204 and/or the peripherals interface 1206 can be separate components or can be integrated in one or more integrated circuits. The various components in the mobile device 100 can be coupled by one or more communication buses or signal lines.

Sensors, devices, and subsystems can be coupled to the peripherals interface 1206 to facilitate multiple functionalities. For example, motion sensor 1210, light sensor 1212, and proximity sensor 1214 can be coupled to the peripherals interface 1206 to facilitate orientation, lighting, and proximity functions. For example, in some implementations, the light sensor 1112 can be utilized to facilitate adjusting the brightness of the touch screen 1246. In some implementations, the motion sensor 1210 can be utilized to detect movement of the device.

Other sensors 1216 can also be connected to the peripherals interface 1206, such as a positioning system (e.g., GPS receiver), a temperature sensor, a biometric sensor, or other sensing device, to facilitate related functionalities.

For example the device 1200 can receive positioning information from positioning system 1232. The positioning system 1232, in various implementations, can be a component internal to the device 1200, or can be an external component coupled to the device 1200 (e.g., using a wired connection or a wireless connection). In some implementations, the positioning system 1232 can include a GPS receiver and a positioning engine operable to derive positioning information from received GPS satellite signals. In other implementations, the positioning system 1232 can include a compass (e.g., a magnetic compass), a gyro and an accelerometer, as well as a positioning engine operable to derive positioning information based on dead reckoning techniques. In still further implementations, the positioning system 1232 can use wireless signals (e.g., cellular signals, IEEE 802.11 signals) to determine location information associated with the device. Other positioning systems are possible.

Other positioning systems and technologies can be implemented on, or coupled to the mobile device to allow the mobile device to self-locate. In some implementations, precision of location determination can be improved to include altitude information. In some implementations, the precision of location determination can be improved. For example, a user's exact location may be determined within building structures using sonar technologies. In such implementations, building structure information may be obtained through a server of such information.

Broadcast reception functions can be facilitated through one or more radio frequency (RF) receiver(s) 1218. An RF receiver can receive, for example, AM/FM broadcast or satellite broadcasts (e.g., XM® or Sirius® radio broadcast). An RF receiver can also be a TV tuner. In some implementations, The RF receiver 1218 is built into the wireless communication subsystems 1224. In other implementations, the RF receiver 1218 is an independent subsystem coupled to the device 1200 (e.g., using a wired connection or a wireless connection). The RF receiver 1218 can include a Radio Data System (RDS) processor, which can process broadcast content and simulcast data (e.g., RDS data). In some implementations, the RF receiver 1218 can be digitally tuned to receive broadcasts at various frequencies. In addition, the RF receiver 1218 can include a scanning function which tunes up or down and pauses at a next frequency where broadcast content is available.

Camera subsystem 1220 and optical sensor 1222 (e.g., a charged coupled device (CCD) or a complementary metal-oxide semiconductor (CMOS) optical sensor), can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving and/or transmitting data. The specific design and implementation of the communication subsystem 1224 can depend on the communication network(s) over which the mobile device 100 is intended to operate. For example, a mobile device 100 may include wireless communication subsystems 1224 designed to operate over a GSM network, a GPRS network, an EDGE network, 802.x communication networks (e.g., WiFi, WiMax, or 3G networks), code division multiple access (CDMA) and a Bluetooth™ network. The wireless communication subsystems 1224 may include hosting protocols such that the device 1200 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1226 can be coupled to speaker 1228 and one or more microphones 1230 to facilitate voice-enabled functions, such as voice recognition, voice replication, digital recording, and telephony functions.

I/O subsystem 1240 can include touch screen controller 1242 and/or other input controller(s) 1244. The touch-screen controller 1242 can be coupled to touch screen 1246. The touch screen 1246 and touch screen controller 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1246.

The other input controller(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of the speaker 1228 and/or the microphone 1230.

In one implementation, a pressing of the button for a first duration may disengage a lock of the touch screen 1246; and a pressing of the button for a second duration that is longer than the first duration may turn power to the mobile device 1200 on or off. The user may be able to customize a functionality of one or more of the buttons. The touch screen 1246 can, for example, also be used to implement virtual or soft buttons and/or a keypad or keyboard.

In some implementations, the mobile device 1200 can present recorded audio and/or video files, such as MP3, AAC, and MPEG files. In some implementations, the mobile device 1200 can include the functionality of an MP3 player, such as an iPod™. The mobile device 1200 may, therefore, include a dock connector that is compatible with the iPod™. Other input/output and control devices can also be used.

The memory interface 1202 can be coupled to memory 1250. The memory 1250 can include high-speed random access memory and/or non-volatile memory, such as one or more magnetic disk storage devices, one or more optical storage devices, and/or flash memory (e.g., NAND, NOR). The memory 1250 can store an operating system 1252, such as Darwin, RTXC, LINUX, UNIX, OS X, WINDOWS, or an embedded operating system such as VxWorks. The operating system 1252 may include instructions for handling basic system services and for performing hardware dependent tasks. In some implementations, the operating system 1252 can be a kernel (e.g., UNIX kernel).

The memory 1250 may also store communication instructions 1254 to facilitate communicating with one or more additional devices, one or more computers and/or one or more servers. The communication instructions 1254 can also be used to select an operational mode or communication medium for use by the device, based on a geographical location (e.g., obtained by the GPS/Navigation instructions 1268) of the device. The memory 1250 may include graphical user interface instructions 1256 to facilitate graphic user interface processing; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GPS/Navigation instructions 1268 to facilitate GPS and navigation-related processes and instructions; camera instructions 1270 to facilitate camera-related processes and functions; and/or other software instructions 1272 to facilitate other processes and functions, e.g., security processes and functions, device customization processes and functions (based on predetermined user preferences), and other software functions. The memory 1250 may also store other software instructions (not shown), such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively. An activation record and International Mobile Equipment Identity (IMEI) 1274 or similar hardware identifier can also be stored in memory 1250. Scenario-based instruction 1276 can also be stored in memory 1250.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions of the mobile device 1200 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a composition of matter capable of effecting a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
   presenting a primary desktop on a display of a mobile device;
   at a first moment in time and while the primary desktop is presented on the mobile device, detecting on the mobile device a first event scenario, the first event scenario being defined by two or more participants and one or more contextual cues concurrently monitored by the mobile device and observable to a user of the mobile device, wherein the detecting the first event scenario comprises:
   determining a current time,
   identifying two or more persons present in proximity to the mobile device, and
   receiving on the mobile device notification of a scheduled calendar event, the notification indicating an imminent start of the scheduled calendar event and that the identified two or more persons are participants of the scheduled calendar event;
   in response to detecting the first event scenario and without requiring further user input, presenting an alternate, scenario desktop on the display of the mobile device in place of the primary desktop;
   receiving user input accessing one or more documents through the scenario desktop during the first event scenario; and
   creating an information bundle associated with the first event scenario, the information bundle comprising respective data identifying the one or more participants, the one or more contextual cues, and the one or more documents that are accessed by the user through the scenario desktop,
   wherein the alternate, scenario desktop is independent of the primary desktop, and wherein the display of the mobile device can exclusively present one desktop at a time.

2. The method of claim 1, wherein detecting the first event scenario further comprises:
   receiving a first user input on a touch-sensitive display of the mobile device, the first user input indicating a start of the first event scenario.

3. The method of claim 1, wherein detecting the first event scenario further comprises:
   determining a current location of the mobile device;

determining a current time; and
receiving on the mobile device notification of a scheduled calendar event, the notification indicating an imminent start of the scheduled calendar event at the current location of the mobile device.

4. The method of claim 1, wherein the one or more contextual cues concurrently monitored by the mobile device and observable to the user of the mobile device include one or more of a current location, a current time, and a sensory characterization of an environment surrounding the mobile device.

5. The method of claim 4, wherein the sensory characterization of the environment surrounding the mobile device includes one or more of a temperature reading, a weather report, identification of a visual landmark present in the environment, and identification of an audio landmark present in the environment.

6. The method of claim 1, further comprising: presenting respective user interface elements for monitoring the two or more participants and the one or more contextual cues on the scenario desktop.

7. The method of claim 1, wherein creating the information bundle further comprises:
deriving respective identifiers, functional labels, or descriptive labels for at least one the two or more participants, contextual cues, or documents; and
creating the information bundle, the information bundle being retrievable based on one or more of the derived identifiers, functional labels, or descriptive labels.

8. The method of claim 7, wherein the information bundle further includes content copied from the one or more documents and content recorded during the first event scenario.

9. The method of claim 1, further comprising:
subsequent to the creating, restoring the primary desktop on the mobile device;
at a second moment in time and while the restored primary desktop is presented on the mobile device, detecting on the mobile device a second event scenario, the second event scenario being related to one or more previously recorded event scenarios by at least one common participant or contextual cue;
in response to detecting the second event scenario and without requiring further user input, retrieving respective information bundles for the one or more previously recorded event scenarios based on the at least one common participant or contextual cue; and
providing on the mobile device a respective content desktop for each of the retrieved information bundles, the respective content desktop providing access to documents or data items identified in the retrieved information bundle,
wherein the respective content desktop is separate from the primary desktop.

10. The method of claim 9, wherein the primary desktop and each of the content desktops are switchable in the display of the mobile device in response to user input.

11. The method of claim 10, further comprising:
providing on the mobile device a second scenario desktop for the second event scenario, wherein the primary desktop, the second scenario desktop, and the content desktop are switchable in the display of the mobile device in response to user input.

12. The method of claim 11, wherein each of the content desktops provides a link to the second scenario desktop for associating a document accessible in the content desktop with the second event scenario.

13. The method of claim 9, wherein the first event scenario is associated with a first scheduled calendar event, and the second event is associated with a second scheduled calendar event related to the first calendar event.

14. The method of claim 1, further comprising:
receiving on the mobile device a query indicating at least one of the one or more of the contextual cues;
retrieving, based on the contextual cues indicated in the received query, the information bundle associated with the first event scenario; and
presenting on the mobile device a content desktop for the retrieved information bundle, the respective content desktop for accessing documents or data items associated with the retrieved information bundle.

15. A non-transitory computer-readable medium having instructions stored thereon, which, when executed by one or more processors, cause the one or more processors to perform operations comprising:
presenting a primary desktop on a display of a mobile device;
at a first moment in time and while the primary desktop is presented on the mobile device, detecting on the mobile device a first event scenario, the first event scenario being defined by two or more participants and one or more contextual cues concurrently monitored by the mobile device and observable to a user of the mobile device, wherein the detecting the first event scenario comprises:
determining a current time,
identifying two or more persons present in proximity to the mobile device, and
receiving on the mobile device notification of a scheduled calendar event, the notification indicating an imminent start of the scheduled calendar event and that the identified two or more persons are participants of the scheduled calendar event;
in response to detecting the first event scenario and without requiring further user input, presenting an alternate, scenario desktop on the display of the mobile device in place of the primary desktop;
receiving user input accessing one or more documents through the scenario desktop during the first event scenario; and
creating an information bundle associated with the first event scenario, the information bundle comprising respective data identifying the two or more participants, the one or more contextual cues, and the one or more documents that are accessed by the user through the scenario desktop,
wherein the alternate, scenario desktop is independent of the primary desktop, and wherein the display of the mobile device can exclusively present one desktop at a time.

16. A system comprising:
one or more processors;
memory coupled to the one or more processors and operable for storing instructions, which, when executed by the one or more processors, cause the one or more processors to perform operations, comprising:
presenting a primary desktop on a display of a mobile device;
at a first moment in time and while the primary desktop is presented on the mobile device, detecting on the mobile device a first event scenario, the first event scenario being defined by two or more participants and one or more contextual cues concurrently monitored by the mobile device and observable to a user of the mobile device, wherein the detecting the first event scenario comprises:

determining a current time, identifying two or more persons present in proximity to the mobile device, and receiving on the mobile device notification of a scheduled calendar event, the notification indicating an imminent start of the scheduled calendar event and that the identified two or more persons are participants of the scheduled calendar event;

in response to detecting the first event scenario and without requiring further user input, presenting an alternate, scenario desktop on the display of the mobile device in place of the primary desktop;

receiving user input accessing one or more documents through the scenario desktop during the first event scenario; and creating an information bundle associated with the first event scenario, the information bundle comprising respective data identifying the two or more participants, the one or more contextual cues, and the one or more documents that are accessed by the user through the scenario desktop, wherein the alternate, scenario desktop is independent of the primary desktop, and wherein the display of the mobile device can exclusively present one desktop at a time.

* * * * *